United States Patent [19]
Shiojima

[11] Patent Number: 5,345,162
[45] Date of Patent: Sep. 6, 1994

[54] CHARGING CIRCUIT OF SECONDARY BATTERY

[75] Inventor: Nobuo Shiojima, Tokyo, Japan

[73] Assignee: Toshiba Battery Co., Ltd., Tokyo, Japan

[21] Appl. No.: 945,951

[22] Filed: Sep. 17, 1992

[30] Foreign Application Priority Data

Sep. 19, 1991 [JP] Japan ............................ 3-239778

[51] Int. Cl.⁵ ............................................. H02J 7/10
[52] U.S. Cl. .................................... 320/21; 320/39
[58] Field of Search ................. 320/20, 21, 22, 23, 320/24, 37, 38, 39, 40

[56] References Cited

FOREIGN PATENT DOCUMENTS

| 0615339 | 10/1961 | Japan . | |
|---|---|---|---|
| 1144329 | 6/1989 | Japan . | |
| 0270741 | 10/1989 | Japan | 320/39 |
| 0270742 | 10/1989 | Japan | 320/39 |
| 3-118730 | 5/1991 | Japan . | |

Primary Examiner—Kristine L. Peckman
Attorney, Agent, or Firm—Oblon, Spivak, McClelland, Maier & Neustadt

[57] ABSTRACT

A reference voltage generating circuit generates a reference voltage Vz, which is a predetermined level different from the potential of one of the terminals of a secondary battery. A minute voltage change extracting circuit comprises a operational amplifier to which the reference voltage Vz is input, a capacitor C, and a resistor R. The minute voltage change extracting circuit extracts minute voltage changes, which appear in the last stage of a process of charging the secondary battery and have components of a frequency higher than a change in a terminal voltage corresponding to the amount of charge, as output signals which vary around the reference voltage Vz. The output signals are shaped into pulse signals by a shaping circuit. The pulse signals are counted by a counter circuit. When the count reaches a predetermined value, charging of the secondary battery is controlled.

21 Claims, 13 Drawing Sheets

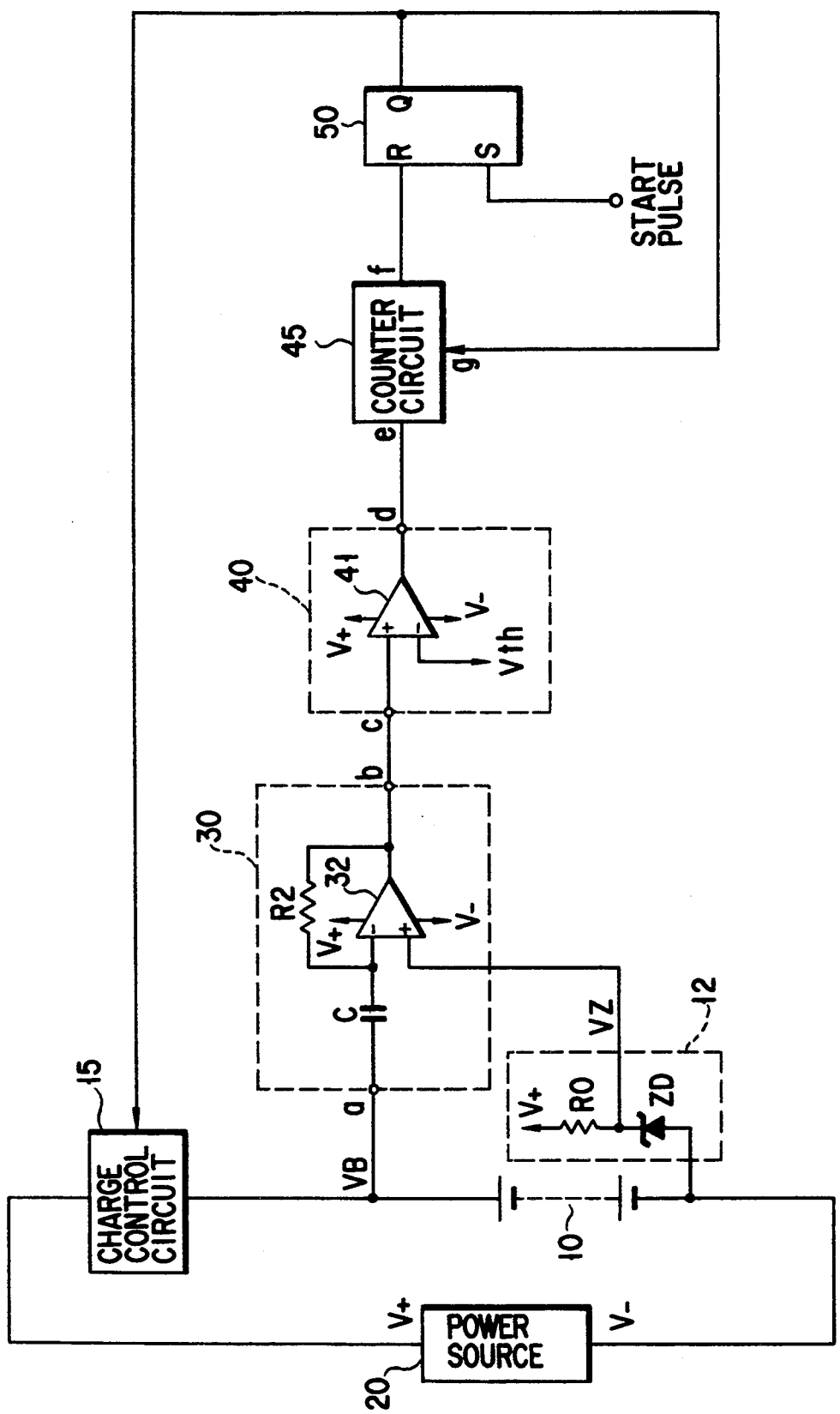
F I G. 1

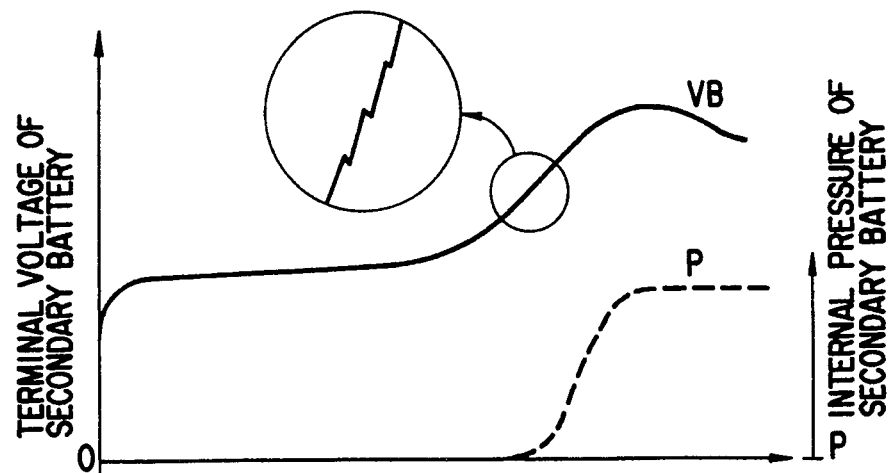
FIG. 2A
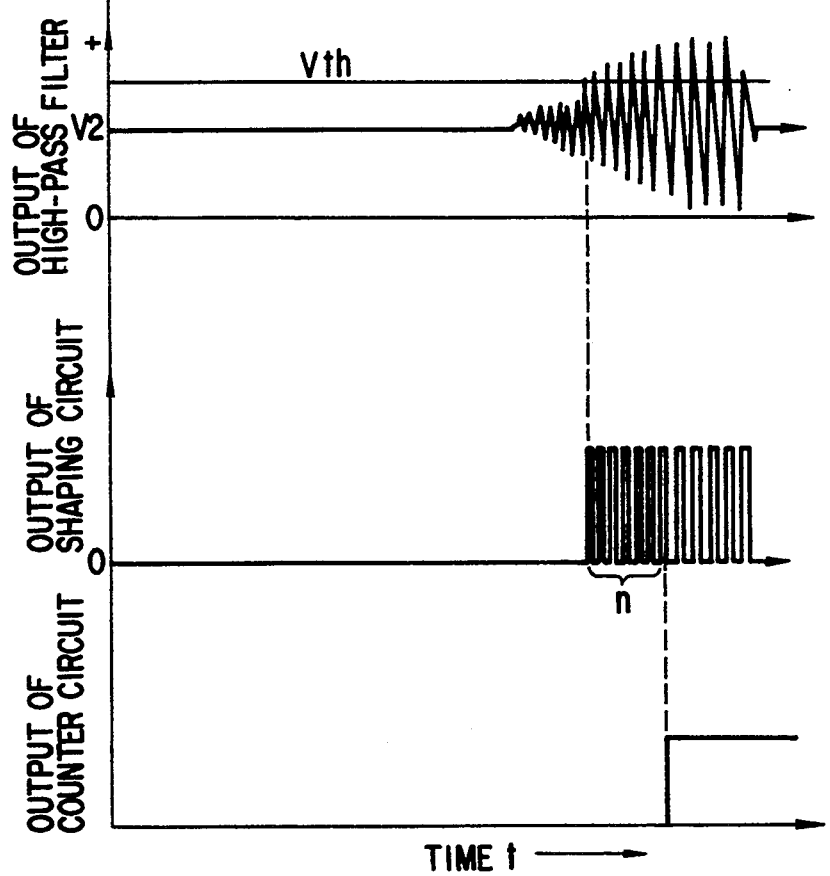
FIG. 2B
FIG. 2C
FIG. 2D

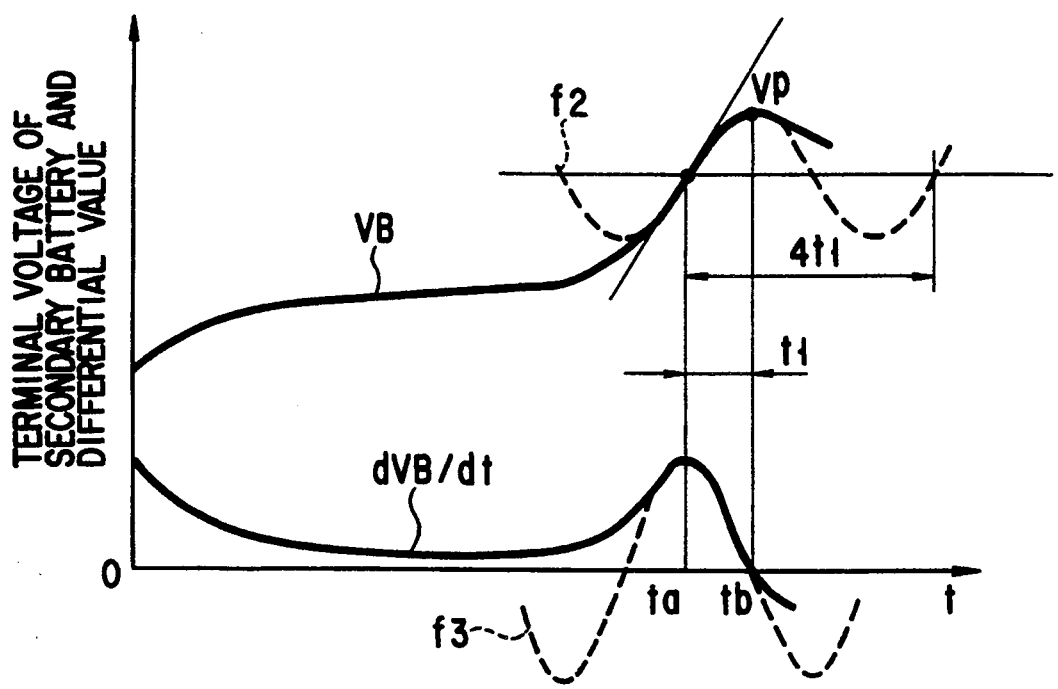
F I G. 3A
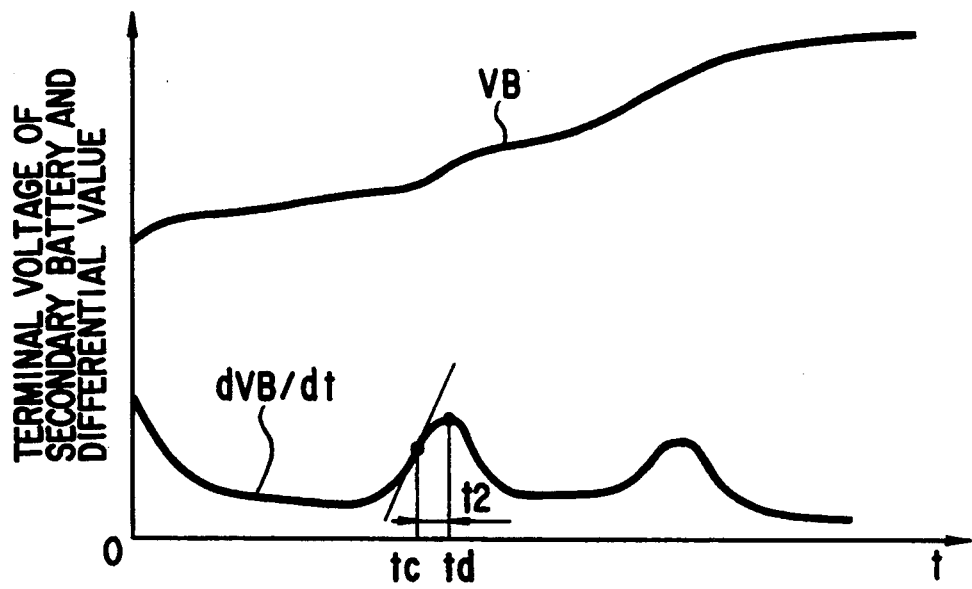
F I G. 3B

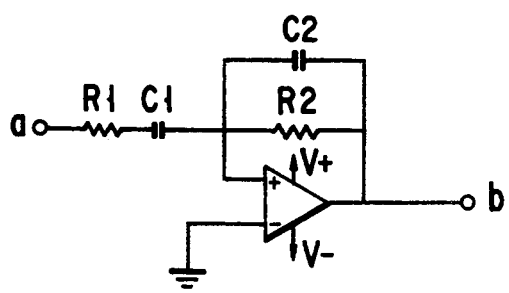
F I G. 4
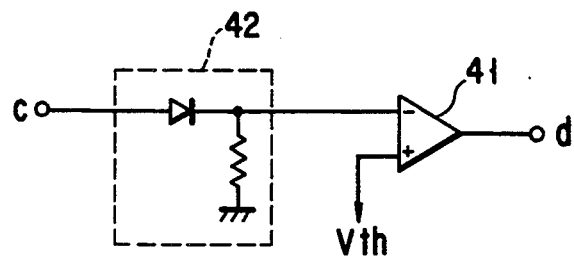
F I G. 5A
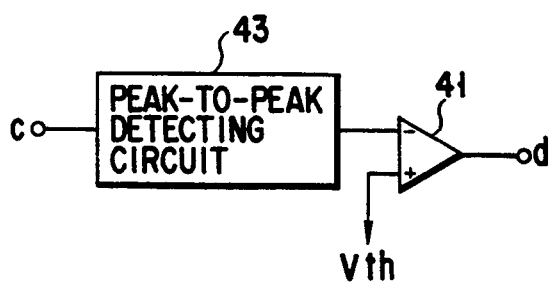
F I G. 5B
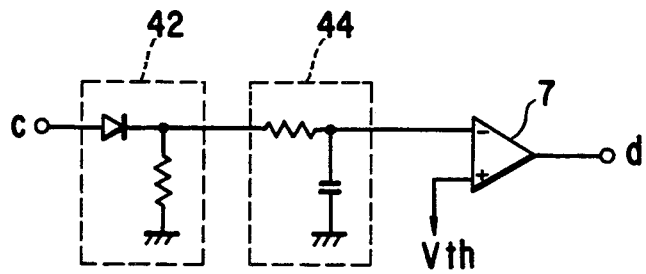
F I G. 5C
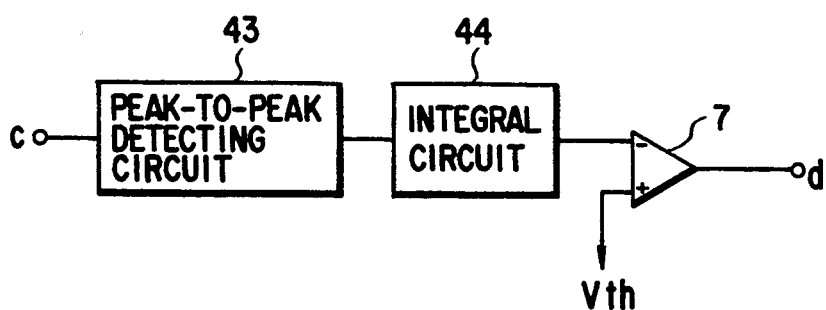
F I G. 5D

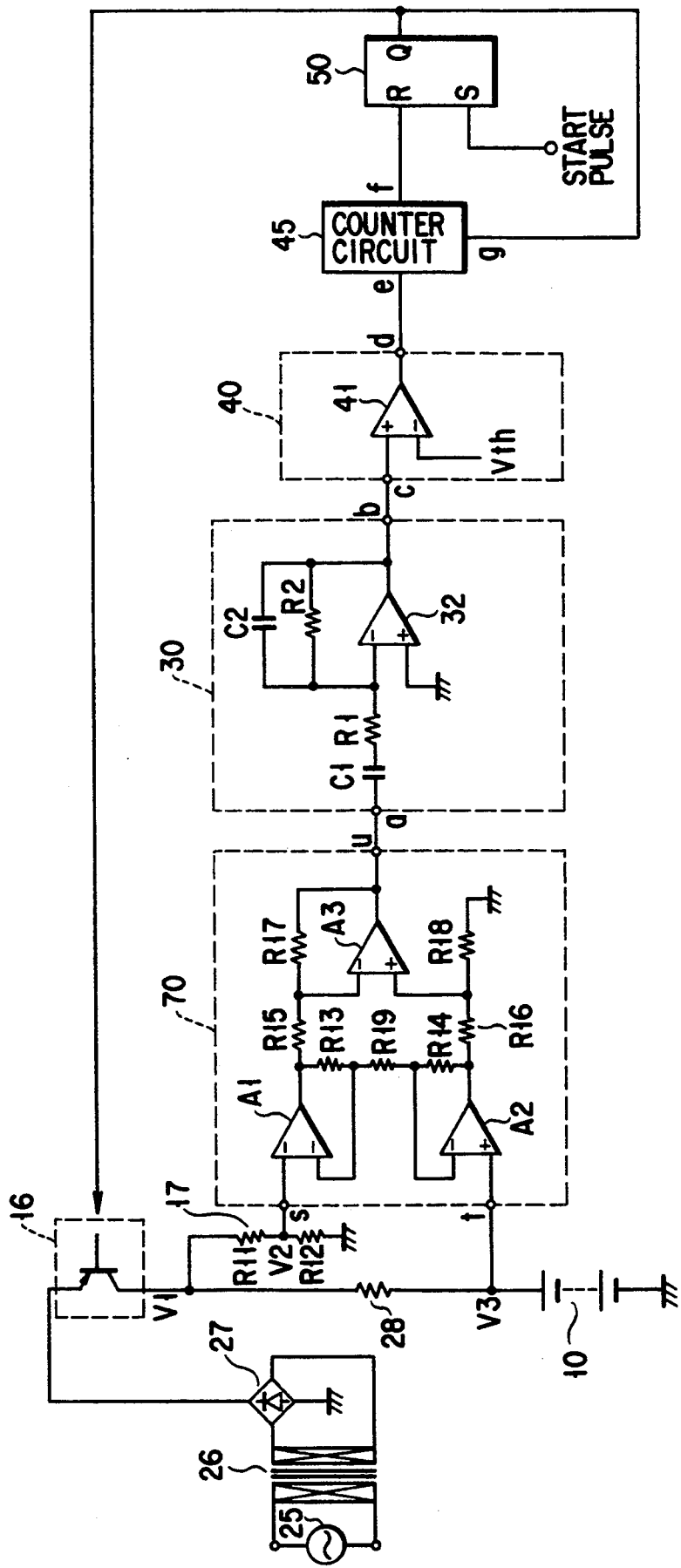
F I G. 9

TIME t →

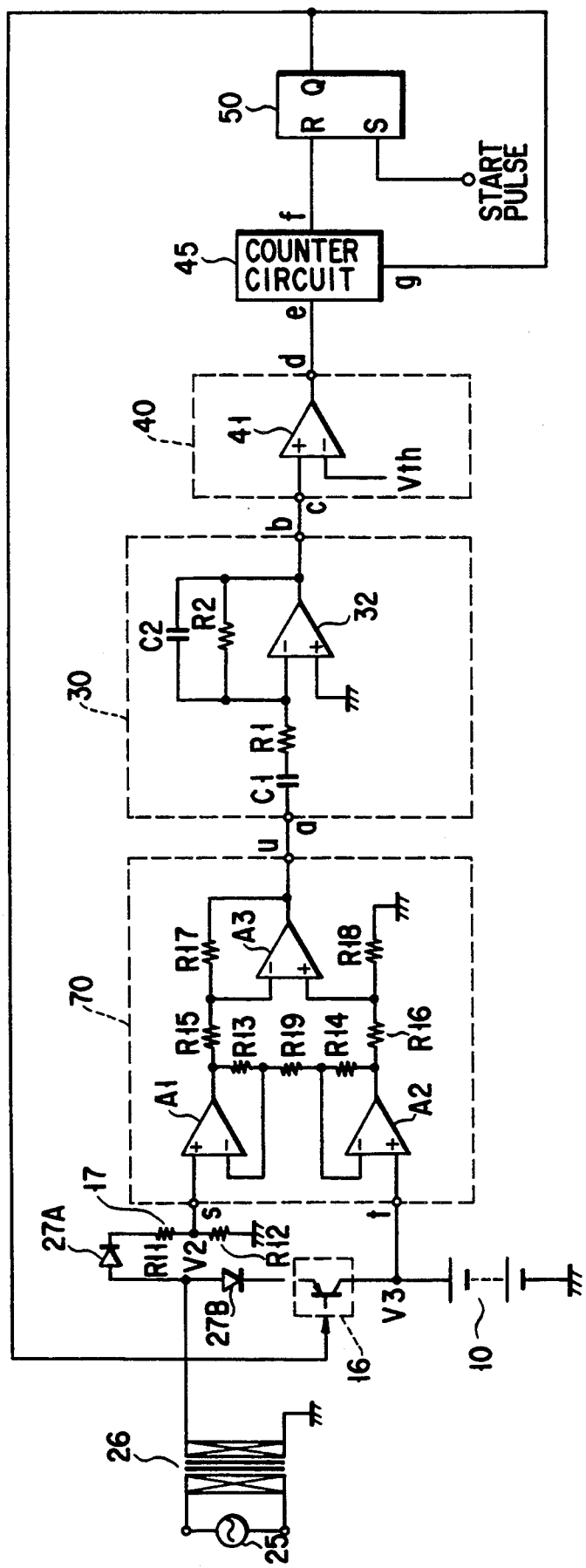
F I G. 13

TIME t

CHARGING CIRCUIT OF SECONDARY BATTERY

BACKGROUND OF THE INVENTION

1. Field of the Invention

The present invention relates to a charging circuit of a secondary battery, and more particularly to a charging circuit which detects a minute change of the voltage appearing in a waveform of the terminal voltage in the final stage of a process of charging the secondary battery, thereby to control the charging operation.

2. Description of the Related Art

Charging circuits for charging a secondary battery utilizing various control methods are known.

A charging circuit utilizing a first control method (hereinafter referred to as a first charging circuit) extracts minute voltage changes, i.e., components having a frequency higher than that of the terminal voltage change corresponding to the amount of charge, which appear in the waveform of the terminal voltage in the last stage of charging, thereby controlling the charging operation (Published Unexamined Japanese Patent Application (PUJPA) No. 3-118730). This charging circuit operates as follows. Minute voltage changes are extracted by a minute voltage change extracting circuit constituted by a differential circuit, and output signals from the minute voltage change extracting circuit are converted to pulse signals by a shaping circuit. Thereafter, the number of pulse signals is counted by a counter. When the count reaches a predetermined value, the charging of the secondary battery is controlled. The minute voltage change extracting circuit is constituted by an active filter using, for example, an operational amplifier.

A charging circuit utilizing a second control method (hereinafter referred to as a second charging circuit) has a differential circuit which is responsive to a change of the terminal voltage corresponding to the amount of charge of the secondary battery. When an output of the differential circuit becomes a preset value, the charging of the secondary battery is stopped (Published Examined Japanese Patent Application (PEJPA) No. 61-5339).

The first charging circuit is less influenced by the variation in charging voltage characteristics of a secondary battery due to the variation in the type of a battery, the charge current and the ambient temperature. Since the last stage of charging can be detected reliably for this reason, overcharge can be prevented. Further, even if a secondary battery using the first charging circuit, which has been charged, is recharged by mistake, overcharge can be prevented, since gas is generated slightly after the recharging is started, resulting in a minute voltage change.

In the second charging circuit, to charge a plurality of (n) secondary batteries connected in series, it is necessary to change the preset value in accordance with the number of the secondary batteries. Therefore, unless the charging voltage characteristics of the secondary batteries are the same, the characteristic of composite charging voltage becomes flat. For this reason, in the second charging circuit, the differential circuit cannot detect completion of a charging operation, and overcharge may occur. In contrast, when the first charging circuit is recharged, a composite of the minute voltage changes of the terminal voltage waveforms of the secondary batteries is superposed on a composite voltage waveform of the n terminal voltages of the secondary batteries. In this case, the minute voltage change of the secondary battery having the least electric capacitance appears first. Therefore, using the same charging circuit used to charge one secondary battery, the charging operation of the first charging circuit having a plurality of secondary batteries is controlled, when the secondary battery of the least capacitance is in the last stage of charging. Thus, overcharge is prevented.

Further, in the first charging circuit, the number of pulse signals obtained by shaping minute voltage changes is counted and a charging operation is continued until the count reaches a predetermined value. Therefore, even if a noise occurs, the charging is not controlled erroneously, although the count may slightly increase.

However, the first charging circuit requires a power source in addition to a power source for charging the secondary battery, resulting in a complicated structure. Therefore, the first charging circuit has a greater number of members and occupies a larger area. This may become a serious problem.

As described above, the minute voltage change extracting circuit is constituted by a differential circuit or a high-pass filter having an operational amplifier, a capacitor, and a resistor as its main components. Therefore, it takes time to stabilize the minute voltage change extracting circuit after the charging operation is started. More specifically, since the terminal voltage of a secondary battery changes greatly immediately after a charging operation is started, the minute voltage change extracting circuit is saturated and is not stabilized until the terminal voltage change is decreased. For this reason, when a secondary battery which has been charged is sent to the charging circuit for recharging by mistake, a minute voltage change which appears immediately after the start of recharging cannot be extracted at once. Thus, since the charging control delays, the secondary battery is accordingly overcharged, with the result that the lifetime thereof is reduced.

In a case where a commercial AC power source is used to recharge a secondary battery, a stable charging current free from noises included in a commercial AC current is required to accurately extract minute voltage changes which appear in the terminal voltage of the secondary battery. If a noise is included in a charging current, it may be extracted as a minute voltage change. To supply a charging current free from a noise, the following methods are known. One is to supply an output of a rectifier circuit, which is connected to a commercial AC power source, to the secondary battery through a constant current circuit using a dropper system. The other is to supply an output of a rectifier circuit to the secondary battery through a constant voltage circuit and a current limiting resistor.

However, in the former method, energy loss particularly in the constant current circuit is great. In the latter method, energy loss in the constant voltage circuit and the current limiting resistor is great. Therefore, in either method, the power supplying portion such as a transformer is large in size to cancel the energy loss. If a compact charging device is used, the temperature thereof increases greatly. Moreover, the entire cost of the charging circuit is increased owing to the constant current circuit or the constant voltage circuit.

SUMMARY OF THE INVENTION

It is a general object of the present invention to provide an improved charging circuit of a secondary battery, which detects minute voltage changes, i.e., components having a frequency higher than that of the terminal voltage change corresponding to the amount of charge, which appear in the waveform of the terminal voltage in the last stage of a process of charging the secondary battery, thereby controlling the charging operation.

It is a more specific object of the present invention to provide a charging circuit of a secondary battery which does not require a power source in addition to a power source for charging.

It is another object of the present invention to provide a charging circuit of a secondary battery, which detects a minute change of the terminal voltage of the secondary battery and does not overcharge the secondary battery which has already been charged.

It is still another object of the present invention to provide a charging circuit of a secondary battery, in which energy loss in the charging current generating section is reduced, a rise in temperature is suppressed even if a compact power source is used, and the circuit structure is simple, and can be manufactured at a low cost.

A charging circuit of a secondary battery according to the first aspect of the present invention is characterized by comprising minute voltage change extracting means for extracting minute changes having components of a frequency a predetermined level higher than a voltage output from the secondary battery during a process of charging the secondary battery, and generating output signals; shaping means for shaping the output signals from said minute voltage change extracting means into pulse signals; counting means for counting the pulse signals output from said shaping means; and charge control means for controlling the operation of charging the secondary battery when the count of the pulse signals obtained by said counting means reaches a predetermined value.

In addition, a charging circuit of a secondary battery according to the first aspect of the present invention is characterized by further comprising reference voltage generating means for generating a reference voltage, which is a predetermined level different from the potential of the first terminal of the secondary battery, wherein said minute voltage change extracting means has two input terminals, one receiving the reference voltage generated from said reference voltage generating means and the other receiving the potential of the second terminal of the secondary battery, said minute voltage change extracting means extracting minute voltage changes which appear in the last stage of a process of charging the secondary battery and have frequency components higher than a change in a terminal voltage corresponding to the amount of charge.

The minute voltage change detecting means is constituted by, for example, an operational amplifier which receives, through one input terminal, a reference voltage generated by reference voltage generating means, a capacitor connected between the other input terminal of the operational amplifier and the secondary battery, and a resistor connected between the other input terminal of the operational amplifier and an output terminal thereof.

In a secondary battery such as a sealed nickelcadmium secondary battery, minute voltage changes appear in the terminal voltage waveform in the last stage of charging, but does not in the first and the middle stages. It is presumed that this phenomenon results from a physical change or a chemical reaction which occurs in the following condition: oxygen gas is generated from the positive electrode in the last stage of a charging process, diffused through a separator toward the negative electrode, and reacts with and is absorbed by the negative electrode.

According to the first aspect of the present invention, the charging circuit detects minute voltage changes, i.e., components having a frequency higher than that of the terminal voltage change corresponding to the amount of charge, which appear in the waveform of the terminal voltage in the last stage of charging. The minute voltage changes are shaped into pulse signals which are counted. When the count reaches a predetermined value, the charging of the secondary battery is controlled. With this circuit, the last stage of charging can be reliably detected, independent of the type of the secondary battery and the variance of the charging voltage characteristics due to the charging current and the ambient temperature, and the charging operation is controlled. As a result, reduction of the lifetime of the secondary battery due to overcharge can be prevented.

Further, if a secondary battery which has been charged is recharged by mistake, the charging circuit quickly controls the charging, thereby preventing overcharge.

In addition, if a plurality of secondary batteries are connected in series, a secondary battery of the least electric capacitance is prevented from overcharge in the last stage of charging. Therefore, it is unnecessary to use secondary batteries of the same charging voltage characteristic.

In the charging circuit according to the first aspect of the present invention, a charging operation is continued until the number of pulse signals obtained by shaping minute voltage changes reaches a predetermined value, unlike in the method of controlling the charge when the amplitude of a minute voltage change exceeds a predetermined value. Therefore, even if a noise occurs, it will not affect the charging control, although the count slightly increases.

Also, in the charging circuit according to the first aspect of the present invention, a voltage of a predetermined level different from the potential of one terminal of the secondary battery is generated. Since this is used as a reference voltage of the minute voltage change extracting means, the power source for charging the secondary battery also can be used as the power source of the circuits in the charging circuit, e.g., the minute voltage change extracting circuit. As a result, the circuit structure including the power source circuit is simple. Therefore, a compact charging circuit can be manufactured at a low cost. The above feature is particularly advantageous in a charging circuit of a type which is incorporated along with a secondary battery in various electronic devices.

According to a second aspect of the present invention, there is provided, a charging circuit of a secondary battery according to the first aspect of the present invention, wherein minute voltage change extracting circuit further comprises a time constant element and time constant control means for decreasing the time constant of said time constant element when a charging is started.

In the charging circuit according to the second aspect, since the time constant of an element of the time constant circuit in the minute voltage change extracting means is set to a small value at the start of a charging operation, the minute voltage change extracting means immediately responds to a minute voltage change which occurs when a charged secondary battery is recharged. Therefore, overcharge, which may occur when a charged secondary battery is recharged, is prevented. The control of the time constant as described above is effective to prevent malfunction at the start of a charging operation, also in the case of charging a secondary battery which has been discharged.

A charging circuit of a secondary battery having a terminal according to a third aspect of the present invention is characterized by comprising an AC power source; a rectifier circuit having an input terminal connected to said AC power source and an output terminal; a charging current limiting resistor connected between the output terminal of said rectifier circuit and the secondary battery; differential voltage detecting means for detecting the difference between one of a voltage output from the output terminal of said rectifier circuit and a voltage proportional thereto on one hand, and one of a voltage at the terminal of the secondary battery and a voltage proportional thereto on the other; minute voltage change extracting means for extracting minute changes having components of a frequency a predetermined level higher than a voltage output from the secondary battery during a process of charging the secondary battery, and generating output signals; shaping means for shaping the output signals from said minute voltage change extracting means into pulse signals; counting means for counting the pulse signals output from said shaping means; and charge control means for controlling the operation of charging the secondary battery when the count of the pulse signals obtained by said counting means reaches a predetermined value.

In the charging circuit according to the third aspect, differential voltage detecting means detect a difference between a voltage output from the rectifier circuit for rectifying an output of an AC power source or a voltage proportional thereto and a terminal voltage of the secondary battery or a voltage proportional thereto. Otherwise, the differential voltage detecting means may detect a difference between a voltage output from a first rectifier circuit or a voltage proportional thereto and a voltage at the terminal of the secondary battery to which an output from a second rectifier circuit is supplied or a voltage proportional thereto. The differential voltage is substantially free from a noise component included in an AC power voltage. Therefore, since minute voltage changes are extracted from the differential voltage to control the charging operation, an accurate control without influence of a noise is achieved.

Further, according to the third aspect of the present invention, since the charging circuit does not require a constant current circuit or a constant voltage circuit, energy loss is small and heat is generated little. Therefore, a compact and simple charging circuit generating little heat can be produced at a low cost.

A fourth aspect of the present invention is that a charging circuit detects minute voltage changes which appear in the waveform of a terminal voltage in the last stage of charging of a secondary battery, a fast charging operation is switched to a quick charging operation by utilizing the detected minute voltage changes, and the quick charging operation is completed when the charging circuit is brought into a predetermined state.

A charging circuit of a secondary battery according to the fourth aspect of the present invention is characterized by comprising a first charging power source; a second charging power source for outputting a current smaller than said first charging power source; switching means for connecting said first charging power source to the secondary battery in a first charging period, and said second charging power source to the secondary battery in a second charging period; first charge-completion detecting means including minute voltage change extracting means for extracting minute changes having components of a frequency a predetermined level higher than a voltage output from the secondary battery during a process of charging the secondary battery, and detecting completion of charging on the basis of the state of the minute voltage changes; second charge-completion detecting means for detecting completion of charging when the charging circuit is brought into a predetermine state after the start of the second charging period; and control means for terminating the first charging period and bringing the charging circuit into the second charging period when the first charge-completion detecting means detects completion of charging, and terminating the second charging period when the second charge-completion detecting means detects completion of charging during the second charging period.

The charging circuit according to the fourth aspect performs a fast charging during the first charging period, until charge completion timing is detected by the first charge completion detecting circuit including the minute voltage change extracting circuit (for extracting a minute voltage change, i.e., a component having a frequency higher than that of the terminal voltage change corresponding to the amount of charge appearing in the waveform of the terminal voltage in the last stage of a charging process). The charging circuit performs a quick charging during the second charging period until charge completion timing is detected by the second charge completion detecting circuit having a timer circuit. As a result, the secondary battery can be charged substantially 100% of the electrical capacitance within a short period of time.

when the above first to fourth aspects of the present invention are suitably combined, further effects can be obtained.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a circuit diagram showing a charging circuit of a secondary battery according to a first embodiment of the present invention;

FIGS. 2A to 2D are voltage waveform diagrams for explaining an operation of the first embodiment;

FIGS. 3A and 3B are voltage waveform diagrams for explaining an operation of the first embodiment;

FIG. 4 is a diagram showing another example of the high-pass filter of the present invention;

FIGS. 5A to 5D are diagrams showing other examples of the shaping circuit of the present invention;

FIG. 9 is a circuit diagram showing a charging circuit of a secondary battery according to a third embodiment of the present invention;

FIG. 13 is a circuit diagram showing a charging circuit of a secondary battery according to a modification of the third embodiment;

DETAILED DESCRIPTION OF THE PREFERRED EMBODIMENTS

Figure 6:
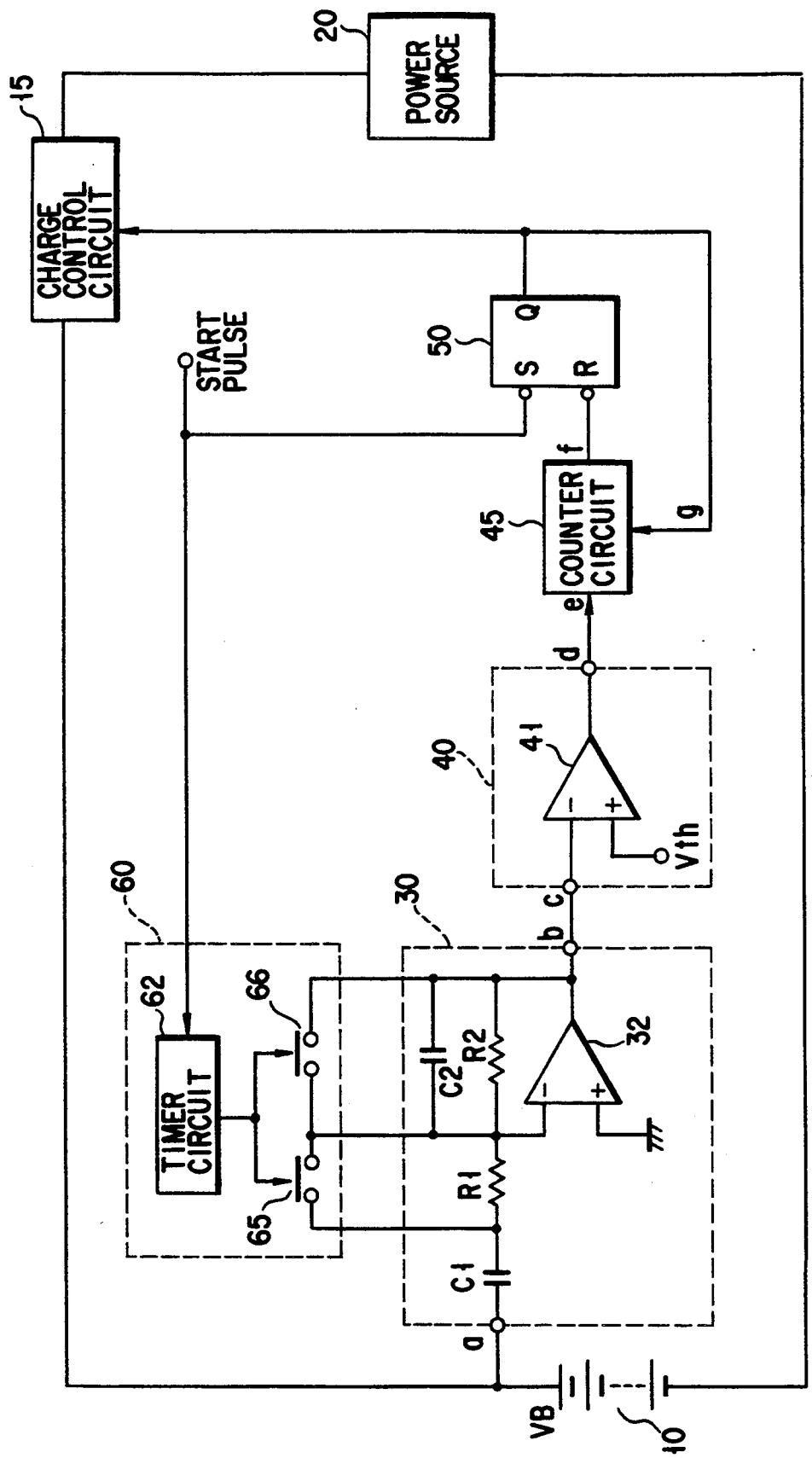
FIG. 6 is a circuit diagram showing a charging circuit of a secondary battery according to a second embodiment of the present invention.

Embodiments of the present invention will be described with reference to the accompanying drawings.

FIG. 1 shows a charging circuit of a secondary battery according to a first embodiment of the present invention.

In FIG. 1, a positive terminal of a secondary battery 10 is connected to a positive terminal ($V_+$) of a power source 20 through a charge control circuit 15. A negative terminal of the secondary battery 10 is connected to a negative terminal ($V_-$) of the power source 20. The charge control circuit 15 comprises a constant current circuit for retaining the charge current at a constant level and a switching circuit for cutting off the charge current when a charging operation is completed. The power source 20 may be a DC source which rectifies an alternating current thereby obtaining a direct current or another type of battery having a relatively large capacity.

A reference voltage generating circuit 12 is connected to the negative terminal of the secondary battery 10. The reference voltage generating circuit 12 comprises a constant voltage element ZD such as a Zener diode or a band-gap reference element, and a resistor $R_0$. The circuit 12 receives power from the power source 20 and generates as a reference voltage, which is predetermined level higher than the voltage output from the negative terminal of the secondary battery 10.

The secondary battery 10 is further connected to a high-pass filter constituting a minute voltage change extracting circuit 30. The high-pass filter is an active filter comprising a capacitor C, an operational amplifier 32, and a resistor R. One end of the capacitor C is connected to the positive terminal of the secondary battery 10 through an input terminal a. An inverting input terminal of the operational amplifier 32 is connected to the other end of the capacitor C, a non-inverting input terminal thereof is connected to the reference voltage generating circuit 12, and an output terminal thereof is connected to an output terminal b of the minute voltage change extracting circuit 30. Positive and negative power source terminals of the operational amplifier 32 are respectively connected to the ends of the power source 20. The resistor R is connected between the inverting input terminal and an output terminal of the operational amplifier 32.

A low cut-off frequency of the high-pass filter is selected to extract a minute voltage change of the terminal voltage $V_B$ appearing in the last stage of charging the secondary battery 10. In other words, in order to extract a minute change of the terminal voltage $V_B$, which appears in the last stage of charging of the secondary battery 10, the low cut-off frequency f1 ($=1/(2\pi CR)$) is selected such that the output, corresponding to the change of the terminal voltage at the time when the rate-of-increase of the terminal voltage of the secondary battery 10 in the last stage of charging is maximized, is smaller than the output corresponding to the minute voltage change. More specifically, assuming that the period between the time when the rate-of-increase of the terminal voltage of the secondary battery 10 in the last stage of charging is maximized and the time when the terminal voltage $V_B$ is maximized is $t_1$, the frequency component of the change of the terminal voltage corresponding to the amount of charge in the last stage of charging is approximately $1/(4t_1)$, and CR is selected such that the low cut-off frequency f1 is greater than $1/(4t_1)$.

The output terminal b of the minute voltage change extracting circuit 30 is connected to an input terminal c of a shaping circuit 40. The shaping circuit 40 shapes minute voltage changes output from the minute voltage change extracting circuit 30 into pulse signals, in order to assure the operation of a counter circuit 45. In this embodiment, the shaping circuit 40 comprises a voltage comparator 41. A non-inverting input terminal and an output terminal of the voltage comparator 41 are respectively connected to the input terminal c and an output terminal d of the shaping circuit 40. Positive and negative power source terminals are connected to the ends of the power source 20. A constant voltage $V_{th}$ is applied to an inverting input terminal of the voltage comparator 41. The output terminal d of the shaping circuit 40 is connected to an input terminal e of the counter circuit 45.

An output terminal f of the counter circuit 45 is connected to a reset terminal R of a flip-flop 50. A start pulse, which is generated in association with a power-on operation or a switching operation, is applied to a set terminal S of the flip-flop 50. An output terminal Q of the flip-flop 50 is connected to a control terminal of the charge control circuit 15 and a reset terminal g of the counter circuit 45.

The charge control circuit is set in a fast charge state when the control terminal thereof (the output terminal Q of the flip-flop 50) is of high level, and in a charge control state when it is of low level. In the charge control state, the operation of charging the secondary battery 10 is completely stopped or the charge current is decreased. The counter circuit 45 is set in a counting state when the reset terminal thereof (the output terminal Q of the flip-flop 50) is of high level, and in a reset state when it is of low level.

Power is supplied to the counter circuit 45 and the flip-flop 50 also from the power source 20, although not depicted.

An operation of the charging circuit shown in FIG. 1 will now be described with reference to the voltage waveform diagrams shown in FIGS. 2A to 2D and FIG. 3A and 3B.

When a start pulse (which is generated in association with a power-on operation or a switching operation) is applied to the set terminal S of the flip-flop 50, the output terminal Q of the flip-flop 50 is of high level. Accordingly, the charge control circuit 15 is set in the fast charge state and the counter circuit 45 is set in the counting state. Under these conditions, a large amount of current is supplied from the power source 20 to the secondary battery 10, thus initiating a fast charging.

In the charging process, the terminal voltage $V_B$ of the secondary battery 10 is changed as shown in FIG. 2A, i.e., it increases abruptly in the early stage of charging, and then gradually increases in the middle stage. In the last stage, the terminal voltage VB again increases abruptly and peaked, and thereafter decreases. In the last stage, since oxygen gas is generated from the positive electrode of the secondary battery, an internal pressure P is increased as indicated by a broken line in FIG. 2A, in a case where the secondary battery is of airtight type.

When oxygen gas generated in the last stage reacts with and absorbed by the negative electrode, minute voltage changes, as shown in an enlarged view in a circle of FIG. 2A, appear intermittently in the waveform of the terminal voltage $V_B$ of the secondary battery 10. The frequency components of the minute voltage changes are much greater than the frequency component of the macroscopic change of the terminal voltage $V_B$ corresponding to the change in the amount of charge of the secondary battery 10. The level of the minute voltage change is low when the change appears first, and becomes higher as the charge progresses and a large amount of oxygen gas is generated.

Referring to FIG. 3A, assuming that the period between the time $t_a$ when the rate-of-increase of the terminal voltage in the last stage of charging is maximized and the time $t_b$ when the terminal voltage $V_B$ becomes a maximum value $V_p$ is $t_1$ (sec), a maximum value f2 (Hz) of the frequency component of a macroscopic change of the terminal voltage $V_B$ in the last stage of the charging is approximately as represented in the following equation (1) (the period of the macroscopic change is $4t_1$ as indicated by a broken line):

$$f2 = 1/(4t_1) \qquad (1)$$

Assuming that the period between the time when the rate-of-increase of the differential value $dV_B/dt$ of the terminal voltage of the secondary battery 10 to the time is maximized and the time when the value $dV_B/dt$ is maximized is $t_2$, a maximum value f3 (Hz) of the frequency component of a macroscopic change of the terminal voltage $V_B$ in the last stage of the charging is approximately as represented in the following equation:

$$f3 = 1/(4t_2) \qquad (2)$$

In general, the frequency component of a distorted wave is represented by a trigonometric function. Since the frequency component does not change even if the trigonometric function is differentiated, the equations (1) and (2) are substantially the same. The maximum value of the frequency component of the macroscopic change in the terminal voltage $V_B$ of the secondary battery 10 can be obtained relatively easily by the equation (1). However, the terminal voltage $V_B$ may not be peaked in the last stage of charging as shown in FIG. 3B, depending on the type of the secondary battery 10, the ambient temperature, and the hysteresis. In such a case, the maximum value of the frequency component can be obtained by the equation (2).

Therefore, if the low cut-off frequency f1 of the high-pass filter is set higher than the frequencies f2 and f3, the output of the high-pass filter corresponding to the macroscopic change at the time when the rate-of-increase of the terminal voltage $V_B$ of the secondary battery 10 is higher than the output thereof corresponding to the frequency component of the minute voltage change. Thus, the frequency component of the minute voltage change can be extracted by the high-pass filter.

The maximum values f2 and f3 of the frequency component of a macroscopic change of the terminal voltage $V_B$ of the secondary battery 10 and the frequency component of the minute voltage change vary depending on the type of the secondary battery 10, the ambient temperature, and the hysteresis. For example, in a case of fast charge, f2 and f3 are substantially 0.001 Hz or less, while the frequency component of the minute voltage change is 0.01 to 20 Hz, which is 10 times or greater than f2 and f3. If the low cut-off frequency f1 of the high-pass filter is set to a value approximate to the geometrical mean between f2 or f3 and the frequency component of the minute voltage change, even if f2, f3 and the frequency component of the minute voltage change are slightly varied, the frequency component of the minute voltage change can be extracted. In this case, the higher f1, the lower the cost, since the constants of the capacitor C and the resistor R can be smaller. Therefore, it is desirable that f1 be set about 0.1 Hz.

As described above, the minute voltage change extracting circuit 30 generates at the output terminal b an output (as shown in FIG. 2B) which varies around a reference voltage $V_z$ which is generated from the reference voltage generating circuit 12 in accordance with the minute change of the terminal voltage $V_B$ of the secondary battery 10. Referring to FIG. 2B, the negative terminal $V_{31}$ of the power source 20 is set to 0 V. The output of the minute voltage change extracting circuit 30 is input to the shaping circuit 40, and compared with the constant voltage $V_{th}$ by the voltage comparator 41. The shaping circuit 40 outputs pulse signals corresponding to the minute changes of the terminal voltage $V_B$ of the secondary battery 10, as shown in FIG. 2C. The pulse signals are supplied to the input terminal e of the counter circuit 45.

When the number of pulse signals input to the input terminal e becomes a predetermined value n, the output terminal f of the counter circuit 45 becomes high in level and the flip-flop 50 is reset. Since the output terminal Q of the flip-flop 50 is of a low level in the reset state, the charge control circuit 15 is set in the charge control state, and operates to stop charging the secondary battery 10 or reduce the charge current.

As has been described above, the minute voltage change extracting circuit 30 extracts minute voltage changes which appear in the terminal voltage waveform in the last stage of the process of charging the secondary battery 10. The counter circuit 45 counts the number of pulse signals, which are generated every time the output from the minute voltage change extracting circuit 30 exceeds the reference voltage $V_{th}$. When the count becomes n, the charging operation is controlled. In this manner, the secondary battery 10 can be charged suitably without causing overcharge. Although a charge voltage characteristic varies depending on the type of the secondary battery and conditions such as the charge current, the ambient temperature, or the like, a minute voltage change appears in the last stage of charging, independent of the type of the secondary battery and these conditions. Since the charging circuit of the present invention detects the last stage of charging on the basis of a minute voltage change, overcharge does not occur.

Even if a charged secondary battery is recharged by mistake, overcharge can be prevented, since oxygen gas is generated in the same manner as in the last stage of charging, resulting in a minute voltage change.

when a plurality of secondary batteries connected in series are charged, a minute voltage change of a secondary battery having the smallest capacitance is detected first in the last stage of charging. Since charging of all the secondary batteries is controlled at this time, the secondary battery of the smallest capacity is not overcharged. Therefore, it is unnecessary to select secondary batteries of the same capacity, unlike in the conventional apparatus.

Further, even if noise occurs in a fast charging operation, since charging is continued until the count in the counter circuit 45 becomes n, the noise does not cause an erroneous operation that charge control is performed immediately. Thus, undercharge is also prevented.

In addition, since the reference voltage Vz applied to the operational amplifier 32 of the minute voltage change extracting circuit 30 is set a predetermined level higher than the potential of the negative terminal of the secondary battery 10, the minute voltage change extracting circuit 30 generates an output corresponding to the minute change of the terminal voltage $V_B$ of the secondary battery 10, which varies around the voltage Vz. Therefore, the potential of the negative power source terminal of the minute voltage change extracting circuit 30 can be the same as that of the negative terminal of the secondary battery 10. Thus, the power source 20 for charging the secondary battery 10 can be used also as the power source of the minute voltage change extracting circuit 30. In other words, no additional power source for the minute voltage change extracting circuit 30 is required. Accordingly, the constitution of the charging circuit is simple. The reference voltage Vz may be a predetermined level lower than the potential of the negative terminal of the secondary battery 10, in which case the same effect as described above will be obtained.

In this embodiment, the high-pass filter serving as the minute voltage change extracting circuit 30 is an active filter constituted by a resistor, a capacitor, and an operational amplifier. However, an additional resistor may be connected in series to the capacitor to stabilize the operation. Further, an active filter of another type, a passive filter which does not use an operational amplifier, or a digital filter may be used as the high-pass filter. Furthermore, in place of the high-pass filter, a band-pass filter, which has the function of a low-pass filter in addition to the function of a high-pass filter, may be used to prevent a malfunction due to variance of the frequency of an AC power source and to stabilize the operation.

The minute voltage change extracting circuit 30 may be replaced by a differential circuit for obtaining a slope of a voltage change of the secondary battery 10 with respect to the time. In this case, the constitution of the differential circuit may be basically the same as that of the minute voltage change extracting circuit 30 as shown in FIG. 1, although the time constants of the capacitor C and the resistor R must be smaller. FIG. 4 shows an example in which a differential circuit used in place of the minute voltage change extracting circuit 30 and the non-inverting input terminal of the operational amplifier is grounded. The circuit shown in FIG. 4 can also detect a minute voltage change.

The shaping circuit 40 shown in FIG. 1 is constituted only by the voltage comparator; however it can be modified as shown in FIGS. 5A to 5D.

FIG. 5A shows a shaping circuit 40, in which a rectifier circuit 42 is interposed between the input terminal c and the inverting input terminal of the voltage comparator 41. The rectifier circuit 42 in FIG. 5A is a half-wave rectifier circuit having one diode. However, it may be an full-wave rectifier circuit, an ideal circuit in which a diode and an operational amplifier are combined, or an absolute value circuit.

FIG. 5B shows a shaping circuit 40, in which a peak-to-peak detecting circuit 43, for outputting a difference between the maximum and minimum values of outputs of the minute voltage change extracting circuit 30, is interposed between the input terminal c and the inverting input terminal of the voltage comparator 41. With this structure, the level of the input to the voltage comparator is twice as high as that in the structure shown in FIG. 1. Thus, the detection accuracy is increased.

FIG. 5C shows a shaping circuit 40, in which an integral circuit 44 is interposed between the rectifier circuit 42 and the voltage comparator 41 of the shaping circuit 40 shown in FIG. 5A.

FIG. 5D shows a shaping circuit 40, in which an integral circuit 44 is interposed between the peak-to-peak detecting circuit 43 and the voltage comparator 41 of the shaping circuit 40 shown in FIG. 5B.

In the shaping circuits 40 as shown in FIGS. 5C and 5D, a malfunction due to noise is prevented. Further, when a current supply terminal of the charging circuit is brought into contact with a terminal of the secondary battery 10 to supply current, even if vibration or shock occurs, resulting in change in an output of the minute voltage change extracting circuit 30, a malfunction is also prevented.

In addition, by setting the time constant of the integral circuit of the minute voltage change extracting circuit 30 suitably, the counter circuit 45 can be omitted.

The above modifications of the minute voltage change extracting circuit 30 and the shaping circuit 40 can be applied to the following embodiments.

FIG. 6 shows a charging circuit of a secondary battery according to a second embodiment of the present invention. In FIG. 6, components like those in FIG. 1 are identified with like reference symbols, and detailed descriptions thereof are omitted.

The apparatus of the second embodiment differs from that shown in FIG. 1 in that a time constant control circuit 60 is additionally provided, and the minute voltage change extracting circuit 30 is constituted by a high-pass filter or a differential circuit.

A secondary battery 10 is connected to a charging power source 20 through a charge control circuit 15. A positive terminal of the secondary battery 10 is connected to an input terminal of the minute voltage change extracting circuit 30.

The minute voltage change extracting circuit 30 of this embodiment is constructed by an active filter which comprises an operational amplifier 32, first and second capacitors $C_1$ and $C_2$, and first and second resistors $R_1$ and $R_2$. A reference potential (a ground potential in this embodiment) is applied to a non-inverting input terminal of the operational amplifier 32. The first capacitor $C_1$ and the first resistor $R_1$ are connected in series between an input terminal of the minute voltage change extracting circuit 30 and an inverting input terminal of the operational amplifier 32. The second capacitor $C_2$ and the second resistor $R_2$ are connected in parallel between the inverting input terminal of the operational amplifier and an output terminal b (an output terminal of the minute voltage change extracting circuit 30). A low cut-off frequency of the minute voltage change extracting circuit 30 is selected to extract a minute change in the terminal voltage $V_B$ which appears in the last stage in the process of charging the secondary battery 10.

The output terminal b of the minute voltage change extracting circuit 30 is connected to an input terminal c of a shaping circuit 40. The subsequent processes are the same as in the first embodiment.

A start pulse is supplied to the time constant control circuit 60, which is additionally provided in this embodiment. The time constant control circuit 60 reduces the time constant of the minute voltage change extracting circuit 30 when a charging operation is initiated. It comprises a timer circuit 62 which is activated when the charging operation is initiated, and switching elements 65 and 66 which are respectively connected to the resistors $R_1$ and $R_2$ in the minute voltage change extracting circuit 30 and controlled by the timer circuit 62. The switching elements 65 and 66 may be semiconductor switches such as bipolar transistors and field effect transistors, or may be mechanical switches such as lead switches.

An operation of the charging circuit shown in FIG. 6 will be described with reference to voltage waveform diagrams of FIGS. 7A to 7D.

When a start pulse (which is generated in association with a power-on operation or a switching operation) is applied to a set terminal S of the flip-flop 50, the output terminal Q of the flip-flop 50 is high in level. Accordingly, the charge control circuit 15 is set in the fast charge state. In this state, a large amount of current is supplied from the power source 20 to the secondary battery 10, thus initiating a fast charging.

In response to the start pulse, the timer circuit 62 in the time constant control circuit 60 is activated, and the switching elements 65 and 66 are brought into the ON state. As a result, the resistors $R_1$ and $R_2$, which determine a time constant, are short-circuited, thereby decreasing the time constant.

Figure 7A:
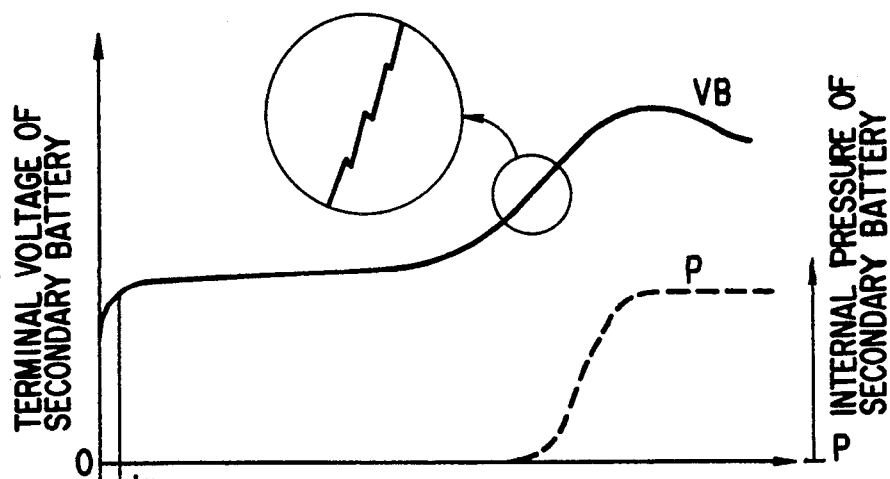
FIGS. 7A to 7D are voltage waveform diagrams for explaining an operation of the second embodiment.

As shown in FIG. 7A, the terminal voltage $V_B$ of the secondary battery 10 abruptly increases during the early stage in the charging operation, i.e., the period between the charging start point (t=0) and the time $t_r$. However, in this period, since the switching elements 65 and 66 are set in the ON state and the time constant of the minute voltage change extracting circuit 30 is kept small, the circuit 30 does not saturated.

In other words, since the resistor $R_1$ is shortcircuited by the switching element 65, with the result that the period to charge the capacitor $C_1$ is reduced, the minute voltage change extracting circuit 30 can sufficiently follow up the abrupt increase of the terminal voltage $V_B$. Since the resistors $R_1$ and $R_2$, which determine the gain of the minute voltage change extracting circuit 30, are short-circuited, the gain thereof is suppressed. In this case, a limit time tm of the timer 62 is set longer than tr. When the change of the terminal voltage $V_B$ decreases, the time constant and the gain of the minute voltage change extracting circuit 30 are increased.

When charging the secondary battery 10 progresses into the last stage, similarly to the embodiment shown in FIG. 1, since the flip-flop 50 is brought into the reset state and the output terminal Q thereof becomes low in level, the charge control circuit 15 is set in the charge control state and operates to stop charging the secondary battery 10 or reduce the charge current.

As described above, when the minute voltage change extracting circuit 30 extracts a minute change of the terminal voltage waveform which appears in the last stage of the process of charging the secondary battery 10, the charging operation is controlled. In this manner, the secondary battery 10 can be charged suitably without causing overcharge. Although a charge voltage characteristic varies depending on the type of the secondary battery and various conditions such as the charge current, the ambient temperature, or the like, a minute voltage change appears in the last stage of charging, independent of the type of the secondary battery and these conditions. Since the charging circuit of the present invention detects the last stage of charging by utilizing a minute voltage change, overcharge does not occur.

Even if a charged secondary battery is recharged by mistake, overcharge can be prevented, in the same manner as in the first embodiment. In the first embodiment, if the time constant of the minute voltage change extracting circuit 30 is as great as in a normal operation, the circuit 30 may be saturated during the first stage of the charging, when the terminal voltage $V_B$ increases considerably. In this case, a minute voltage change, which appears when a charged secondary battery is recharged, cannot be detected. In contrast, according to the second embodiment, since the timer elements 65 and 66 are set in the ON state by the timer circuit 62 when a charging operation is initiated, the time constant is reduced. Therefore, the above problem in the first embodiment can be overcome.

Figure 7B:
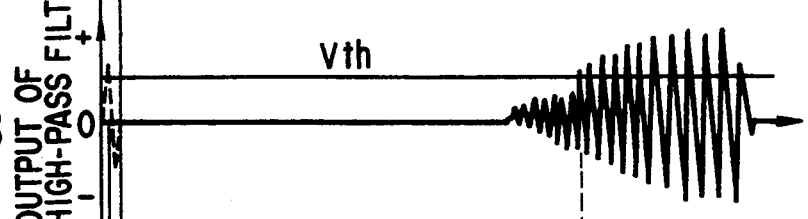
Figure 7C:
Figure 7D:
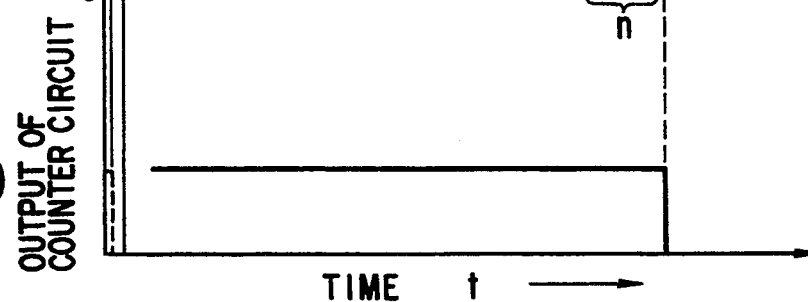

More specifically, when the switching elements 65 and 66 are set in the ON state, the resistors $R_1$ and $R_2$ are short-circuited, with the result that the time constant of the minute voltage change extracting circuit 30 is reduced, the period of time to charge the capacitor $C_1$ is reduced, and the gain of the circuit 30 is reduced. Therefore, the minute voltage change extracting circuit 30 is not saturated, and a minute voltage change occurring during the first stage of charging can be easily extracted. In FIG. 7B, the minute voltage change in the first stage is indicated by a broken line. Broken lines in FIGS. 7C and 7D respectively show a waveform of an output from the shaping circuit 40 and a waveform output from the terminal Q of the flip-flop 50 in the first stage. As apparent from these diagrams, even if a charged secondary battery is recharged, overcharge can be prevented.

Figure 8:
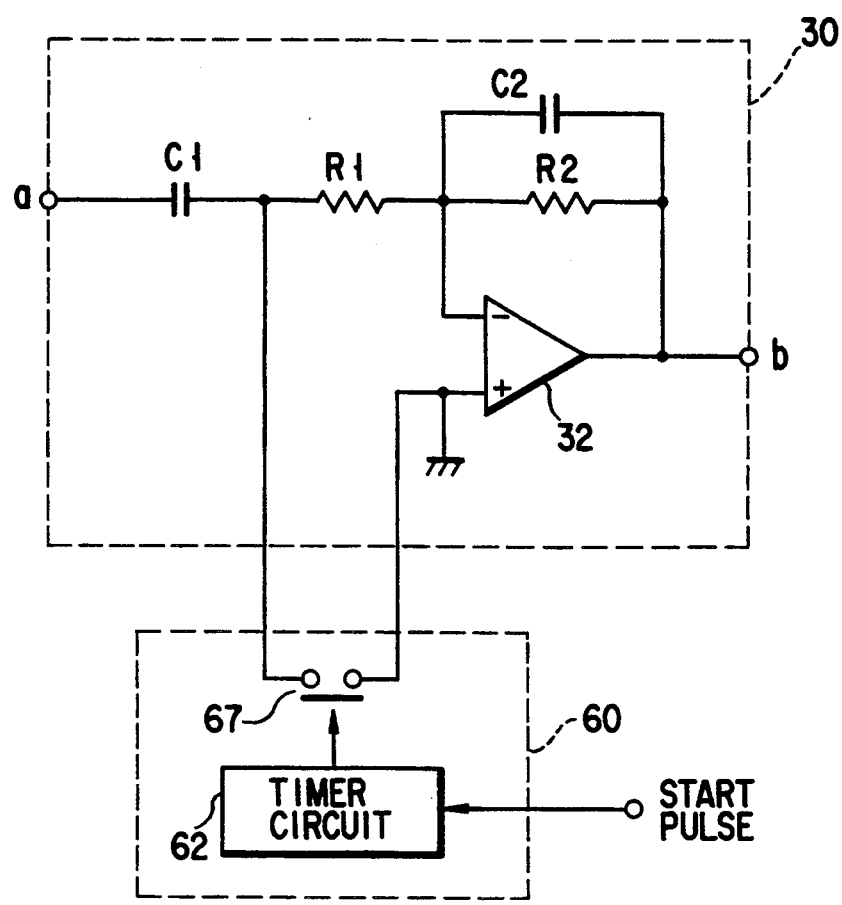
FIG. 8 is a circuit diagram showing a main part of a modification of the second embodiment.

FIG. 8 shows a time constant control circuit 60 according to a modification of the second embodiment. In the time constant control circuit 60, a switching element 67 is interposed between the non-inverting input terminal of the operational amplifier and the connection of the first capacitor $C_1$ and the first resistor $R_1$ of the minute voltage change extracting circuit 30. The switching element 67 is brought in the ON state by the timer circuit 62 only for a time tm in the first stage of charging. In this state, since the end of the capacitor $C_1$ which is connected to the resistor $R_1$ is grounded through the switching element 67, the time constant is reduced as in the first embodiment. Therefore, even if a charged secondary battery is recharged, a minute voltage change can be detected immediately.

FIG. 9 shows a charging circuit of a secondary battery according to a third embodiment of the present invention. The third embodiment is based on the assumption that the power source for charging includes a noise, while the first and second embodiments are not. Components like those in FIGS. 1 and 6 are identified with like reference symbols and detailed descriptions thereof are omitted.

Referring to FIG. 9, a primary side of a transformer 26 is connected to a commercial AC power source 25 (e.g., AC 100 V), while a secondary side thereof is connected to an input terminal of the rectifier circuit 27. An output terminal of the rectifier circuit 27 is connected to one end of a switching circuit 16. For example, a transistor or a thyristor as shown in FIG. 9 is used as the switching circuit 16. The other end of the switching circuit 16 is connected to the secondary battery 10 through a charging current limiting resistor 28, and also to a voltage dividing circuit 17. The voltage dividing circuit 17 comprises resistors $R_{11}$ and $R_{12}$, and the connection of the resistors $R_{11}$ and $R_{12}$ is connected to a first input terminal s of a differential amplifier 70. A second input terminal t of the differential amplifier 70 is connected to the connection between the charging current limiting resistor 28 and the secondary battery 10.

The differential amplifier 70 is constituted by operational amplifiers A1 to A3 and resistors $R_{13}$ to $R_{19}$. Assume that a voltage output from the switching circuit 16, and voltages at the input terminals s and t are respectively, $V_1$, $V_2$, and $V_3$, the values of resistance of the resistors $R_{13}$ and resistance $R_{14}$ are equal, and the values of resistance of the resistors $R_{15}$ to $R_{18}$ are equal, and the values of resistance of the resistor $R_{19}$ is infinite. In this case, an output voltage Vu from the differential amplifier 70 is represented by the following equation:

$$\begin{aligned} Vu &= V_3 - V_2 \\ &= V_3 - V_1 \cdot R_{12}/(R_{11} + R_{12}) \end{aligned} \quad (3)$$

As is apparent from the equation (3), the output voltage Vu is constant-times the difference between $V_3$ and a voltage proportional to $V_1$ (in this case, the constant is 1).

The output terminal u of the differential amplifier 70 is connected to an input terminal a of a band-pass filter serving as the minute voltage extracting circuit 30. The circuit 30 has the same constitution as in FIG. 6. The low cut-off frequency of the band-pass filter is selected to extract a minute voltage change of the terminal voltage $V_3$ appearing in the last stage of the process of charging the secondary battery 10, while the high cut-off frequency thereof is set to a value lower than the frequency of the commercial AC source 25 (e.g., 50 Hz or 60 Hz).

The output terminal b of the minute voltage change extracting circuit 30 is connected to the input terminal c of the shaping circuit 40. The subsequent processes are substantially the same as that in the first embodiment.

The switching circuit 16 is a specific form of the charge control circuit 15 shown in FIG. 1. When the output terminal Q of the flip-flop 50 is of high level, the switching circuit 16 is set in an ON state to fast charge the secondary battery 10. When it is of low level, the switching circuit 16 is set in a charge control state (for example, an OFF state or a relatively high-resistance state), thereby completely stopping the charging operation or decreasing the charging current.

An operation of the charging circuit shown in FIG. 9 will be described with reference to FIGS. 10 to 12.

When a start pulse (which is generated in association with a power-on operation or a switching operation) is applied to the set terminal S of the flip-flop 50, the output terminal Q of the flip-flop 50 is of high level. Accordingly, the switching circuit 16 is set in the fast charge state and the counter circuit 45 is set in the counting state. In this state, a large amount of current is supplied from the rectifier circuit 27 to the secondary battery 10, thus initiating a fast charging.

Figure 10A:
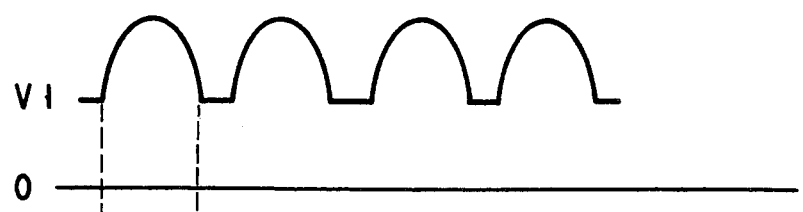
FIGS. 10A to 10C, 11A to 11D, and 12A to 12C are signal waveform diagrams for explaining an operation of the third embodiment.
Figure 10B:
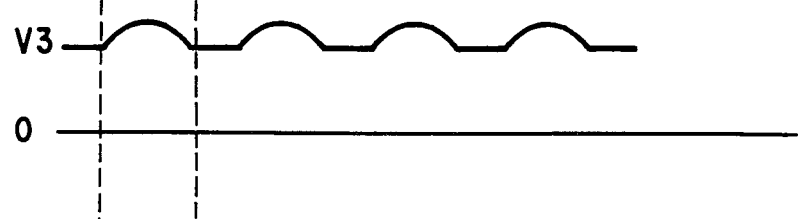
Figure 10C:

At this time, the voltage from the commercial AC power source 25 is lowered by the transformer 26 and full-wave rectifying by the rectifier circuit 27, and the output voltage $V_1$ of the switching circuit 16 has a waveform as shown in FIG. 10A. The terminal voltage $V_3$ of the secondary battery 10 changes in accordance with the waveform of the voltage $V_1$, as shown in FIG. 10B. Therefore, the output Vu of the differential amplifier 70, i.e., the difference between the terminal voltage $V_3$ of the secondary battery 10 and the voltage $V_2$ obtained by dividing the voltage $V_1$ by the resistors $R_{11}$ and $R_{12}$, has a waveform as shown in FIG. 10C. Since the waveform has a frequency band excluded from the pass band of the band-pass filter, it does not appear in the output of the minute voltage change extracting circuit 30.

Figure 11A:
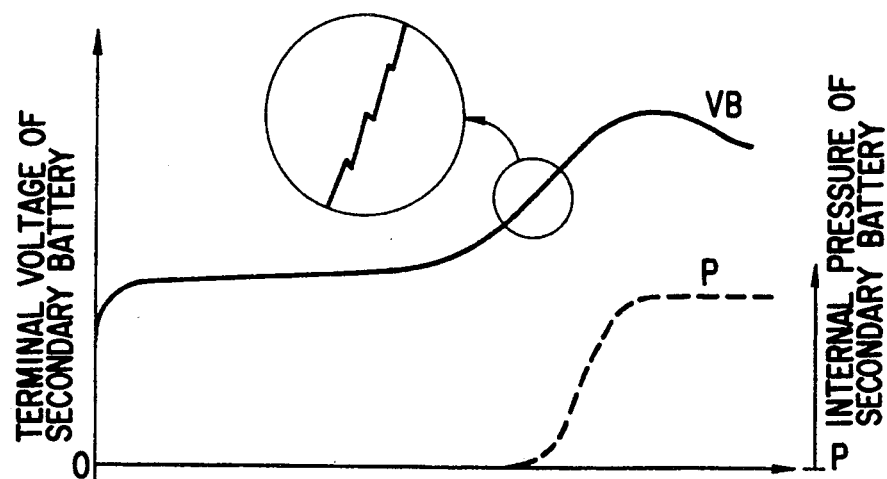

In the above-mentioned fast charging process, the macroscopic change in the terminal voltage $V_3$ of the secondary battery 10 is as shown in FIG. 11A, i.e., it increases abruptly in the early stage of charging, and then gradually increases in the middle stage. In the last stage, the terminal voltage $V_B$ again increases abruptly and peaked, and thereafter decreases. Since oxygen gas is generated from the positive electrode of the secondary battery, an internal pressure P is increased in the last stage, as indicated by a broken line in FIG. 11A, in a case where the secondary battery is of sealed type.

when oxygen gas generated in the last stage reacts with and absorbed by the negative electrode, minute voltage changes, as shown in an enlarged view in a circle of FIG. 11A, appear intermittently in the waveform of the terminal voltage $V_3$ of the secondary battery 10. The frequency components of the minute voltage changes much greater than the frequency component of the macroscopic change of the terminal voltage $V_3$ corresponding to the change in the amount of charge of the secondary battery 10. The level of the minute voltage change is low when the change appears first, and becomes higher as the charge progresses and the amount of oxygen gas is increased.

Figure 11B:
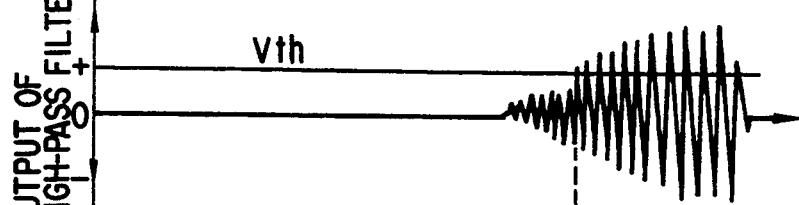

In the last stage of charging, a minute change in the terminal voltage $V_3$ of the secondary battery 10 is input to the second input terminal t of the differential amplifier 70. However, the first input terminal s of the differential amplifier 70 receives the output $V_1$ of the switching circuit 16 which is output of the rectifier circuit 70. Hence, the input through the first input terminal s is little influenced by the minute voltage change. Therefore, the voltage constant-times the minute voltage change is output from the terminal u of the differential amplifier 70, and input to the input terminal a of the minute voltage change extracting circuit 30. The low cut-off frequency and high cut-off frequency are selected to allow passage of at least part of the frequency component of the minute voltage change through the minute voltage change extracting circuit 30. Therefore, the minute voltage change extracting circuit 30 outputs, through the output terminal b, an output corresponding to the minute voltage change in the terminal voltage $V_3$ of the secondary battery 10, as shown in FIG. 11B.

Figure 11C:
Figure 11D:
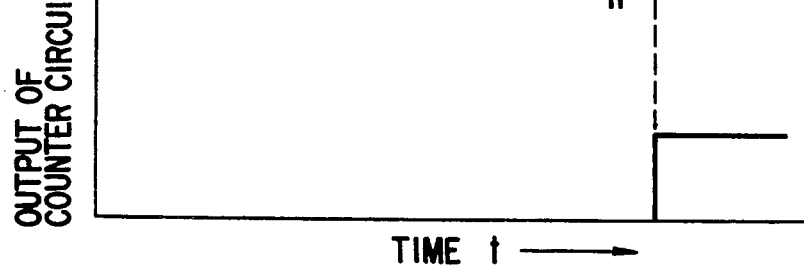

The output of the minute voltage change extracting circuit 30 is input to the voltage comparator 41 and compared with the reference voltage $V_{th}$. The voltage comparator 41 outputs pulse signals corresponding to the minute voltage changes of the secondary battery 10, as shown in FIG. 11C. The pulse signals are input to the input terminal e of the counter circuit 45. The counter circuit 45 counts the pulse signals input to the input terminal e, and when the count become a predetermined value n, an output terminal f becomes high in level. As a result, the flip-flop 50 is reset. Since the output terminal Q of the flip-flop is of the low level when the flip-flop 50 is reset, the charge control circuit 15 is in the charge control state, and operates to stop charging the secondary battery 10 or reduce the charge current.

when noises including a frequency component which falls within the pass band of the minute voltage change extracting circuit 30 are generated from the commercial AC power source 25 and input to the charging circuit during the charging process, noises arise at the means between the resistors $R_{11}$ and $R_{12}$ in the voltage dividing circuit 17 and the input terminals s and t of the differential amplifier 70 connected to the secondary battery 10. In this case, if the $R_{11}$ and $R_{12}$ are set to suitable values such that the levels of the noises at the input terminals s and t of the differential amplifier 70 are equal, substantially no noise arises at the output terminal u of the differential amplifier 70 having a very high common-mode suppression ratio.

Figure 12A:
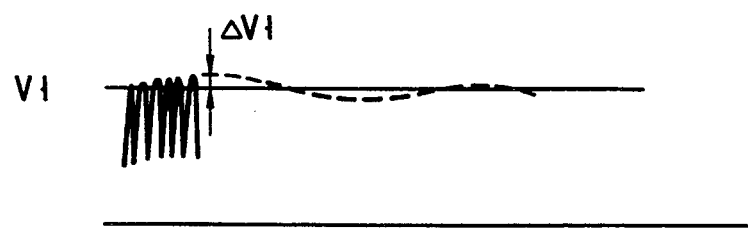
Figure 12B:
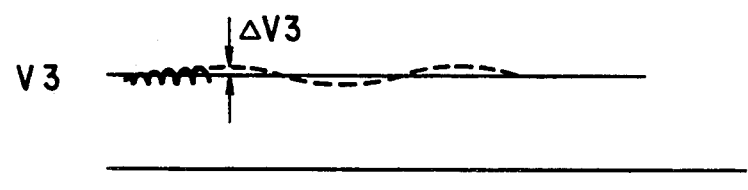

More specifically, noises are superposed on a waveform obtained by lowering and full-wave rectifying the voltage output from the commercial AC power source 25, and the output $V_1$ of the switching circuit 16 has a waveform as shown in FIG. 12A. The terminal voltage $V_3$ of the secondary battery 10 changes in accordance with the $V_1$, as shown in FIG. 12B. Therefore, the output Vu of the differential amplifier 70, i.e., the difference between the terminal voltage $V_3$ of the secondary battery 10 and the voltage $V_2$ obtained by dividing the voltage $V_1$ by the resistors $R_{11}$ and $R_{12}$, has a waveform as shown in FIG. 10C. Since the waveform has a frequency band excluded from the pass band of the band-pass filter, it does not appear in the output of the minute voltage change extracting circuit 30.

The above operation will now be described using equations. Referring to the equation (3), if noise components $\Delta V_1$ and $\Delta V_2$ are included in the voltages $V_1$ and $V_2$, the output voltage Vu of the differential amplifier 70 is represented by the following equation (4):

$$Vu = V_3 + \Delta V_3 - (V_1 + \Delta V_1) \cdot R_{12}/(R_{11} + R_{12}) \quad (4)$$

If the $R_{11}$ and $R_{12}$ are set to suitable values so that $\Delta V_1$ and $\Delta V_2$ have a relationship as follows, $$\Delta V_1 = \Delta V_3 - (R_{11} + R_{12})/R_{12} \quad (5)$$

The equation (4) can be rewritten as follows:

$$Vu = V_3 - V_1 \cdot R_{12}/(R_{11} + R_{12}) \quad (6)$$

Figure 12C:
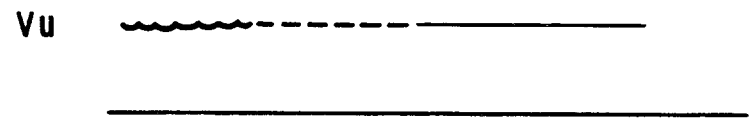

As apparent from the equation (6), the noise components $\Delta V_1$ and $\Delta V_3$ are not included in the output Vu of the differential amplifier 70, and a voltage constant times (the constant is 1, in this case) the right side of the equation (6) is output from the terminal u. Actually, owing to errors of the resistances of the resistors $R_{11}$ and $R_{12}$ and the internal resistance of the secondary battery 10, voltage changes as shown in FIGS. 11C and 12C appear at the terminal u of the differential amplifier 70. However, the level of a noise is very low.

As has been described above, according to the third embodiment, an output of the rectifier circuit 27 is coupled to the secondary battery 10 through the charging current limiting resistor 28 to perform a charging operation. Further, an output of the differential amplifier 70 for detecting the difference between the output of the rectifier circuit 27 and the terminal voltage of the secondary battery 10 is input to the minute voltage change extracting circuit 30 for extracting a minute voltage change appearing in the waveform of the terminal voltage in the last stage of the process of charging the secondary battery 10. Therefore, the operation of the minute voltage change detecting circuit 30 is scarcely influenced by noise components which are transmitted from the commercial AC power source 25 and appear in the waveform of the terminal voltage of the secondary battery 10. In other words, even if an output from the commercial AC power source 25 includes a noise having a frequency falling within the pass band of the band-pass filter, noise components included in the output from the differential amplifier 70 can be reduced if the resistors $R_{11}$ and $R_{12}$ are set to suitable values. As a result, a malfunction due to a noise does not occur and a suitable charge control can be performed.

In addition, energy loss in the apparatus according the third embodiment is less as compared to the method of reducing the influence of noises by a constant current circuit or the combination of a constant voltage circuit and a current limiting resistor. Therefore, even if a compact charging circuit is used, the temperature increase can be suppressed.

A modification of the third embodiment will now be described with reference to FIG. 13. In FIG. 13, components like those in FIG. 9 are identified with like reference symbols.

In this modification, the secondary side of the transformer is connected to input terminals of first and second rectifier circuits 27A and 27B. An output terminal of the first rectifier circuit 27A is connected to a voltage dividing circuit 17 constituted by resistors $R_{11}$ and $R_{12}$. The voltage dividing point of the voltage dividing circuit 17 is connected to a first input terminal s of the differential amplifier 70. An output terminal of the second dividing circuit 27B is connected to the secondary battery 10 and a second input terminal t of the differential amplifier 70 through a switching circuit 16. Half-wave rectifier circuits, each having one diode, are used as the first and second rectifier circuits 27A and 27B in FIG. 13. However, full-wave rectifier circuits may be used instead. The constitution other than the above is the same as in FIG. 9.

In the embodiment of FIG. 13, outputs of the first and second rectifier circuits 27A ad 27B are respectively applied to the voltage dividing circuit 17 and the secondary battery 10, and the switching circuit 16 is interposed between the second rectifier circuit 27B and the secondary battery 10, whereas, in the embodiment of FIG. 9, an output of the rectifier circuit 27 is applied to the voltage dividing circuit 17 and the secondary battery 10 through the switching circuit 16 for switching the fast charge state and the charge control state. In FIG. 13, a charging limiting resistor 28 is not required by controlling the input 25 in order that the output current of the trance 26 is constant.

In this embodiment also, noises may arise in the output voltage from the voltage dividing circuit 17 and the terminal voltage of the secondary battery 10. However, the influence of a noise on the differential amplifier 70 can be eliminated by using suitable resistors $R_{11}$ and $R_{12}$ in the same manner as in the embodiment of FIG. 9. As a result, the same effect can be obtained as in the embodiment of FIG. 9.

Figure 14:
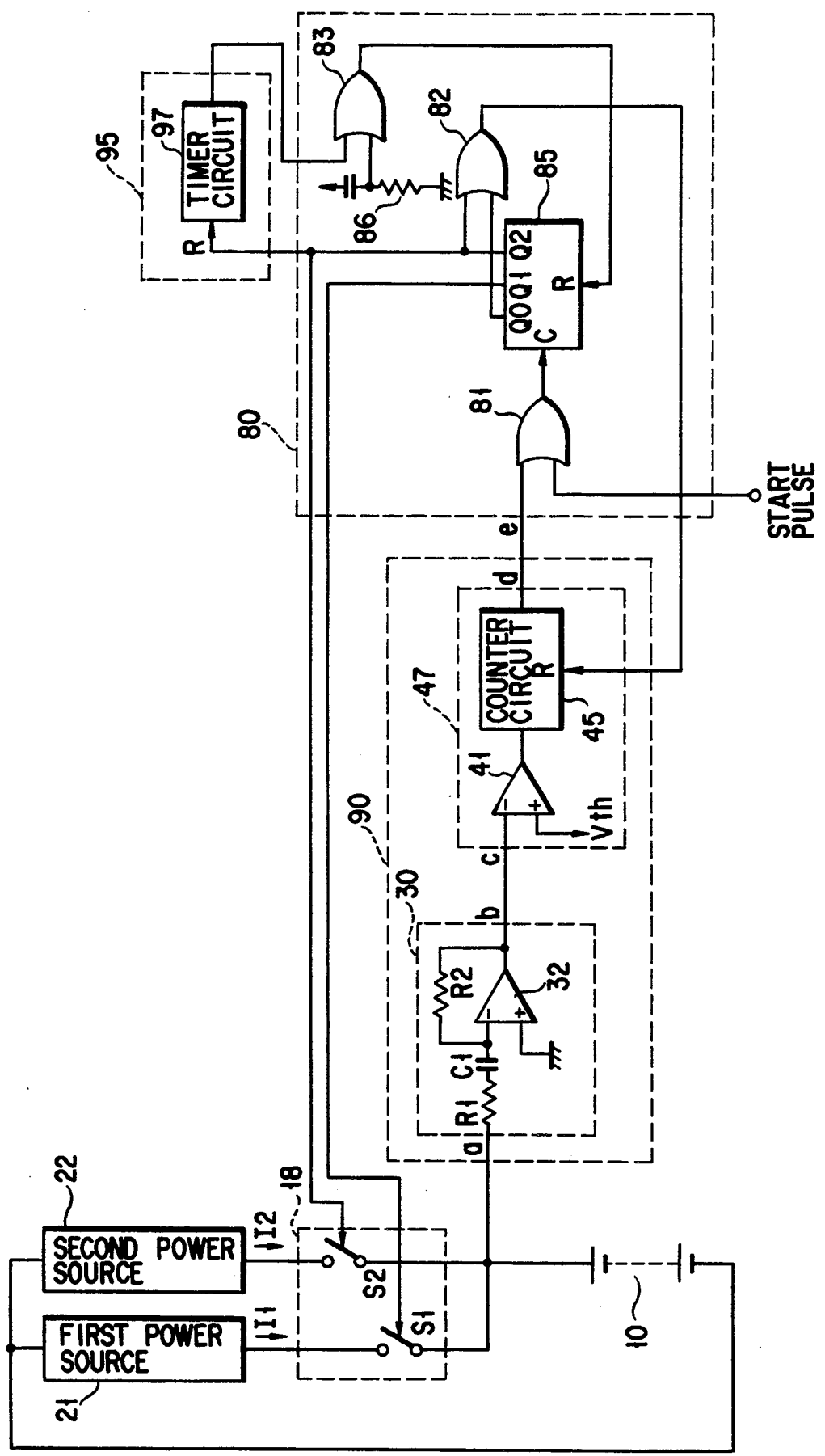
FIG. 14 is a circuit diagram showing a charging circuit of a secondary battery according to a fourth embodiment of the present invention.

FIG. 14 shows a charging circuit of a secondary battery according to a fourth embodiment of the present invention.

Referring to FIG. 14, the secondary battery 10 is selectively connected to a first charging power source 21 or a second charging power source 22 via a switching circuit 18 constituted by switches $S_1$ and $S_2$. A transistor, thyristor, or relay is used as each of the switches $S_1$ and $S_2$. The first and second charging power sources 21 and 22 are respectively used for fast charging and quick charging. Each of the first and second charging power sources 21 and 22 may be a DC power source which rectifies an output of the AC power source to produces a DC output, or another type of battery having a relatively large capacitance, although the second charging power source 22 output a smaller current than the first charging power source 21.

The secondary battery 10 is further connected to a first charge-completion detecting circuit 90, which is constituted by a minute voltage change extracting circuit 30 and a signal processing circuit 47. The minute voltage change extracting circuit 30 is a high-pass filter comprising an operational amplifier 32, a serial circuit of a capacitor $C_1$ and a resistor $R_1$, and a resistor $R_2$. A non-inverting input terminal of the operational amplifier 32 is grounded. The serial circuit is connected between a reverse terminal of the operational amplifier 32 and an input terminal a of the minute voltage change extracting circuit 30 (i.e., an end of the secondary battery 10). The resistor $R_2$ is connected between the inverting input terminal and an output terminal of the operational amplifier 32. The output terminal of the operational amplifier 32 is connected to an output terminal b of the minute voltage change detecting circuit 30. The minute voltage change detecting circuit 30 has a high-pass characteristic to allow passage of at least part of the frequency component of a minute voltage change which appears in the waveform of the terminal voltage of the secondary battery 10 in the last stage of charging.

The output terminal of the minute voltage change extracting circuit 30 is connected to an input terminal c of the signal processing circuit 47. The signal processing circuit 27, in this embodiment, is constituted by a voltage comparator 41 and a counter circuit 45. An inverting input terminal of the voltage comparator 41 is connected the input terminal c of the signal processing circuit 47. An output terminal of the counter circuit 45 is connected to a count input terminal of the counter circuit 45. A reference voltage $V_{th}$ is applied to a non-inverting input terminal of the voltage comparator 41. An output terminal of the counter circuit 45 is connected to an output terminal d of the signal processing circuit 47.

The output terminal d of the signal processing circuit 47 is connected to an input terminal e of a control circuit 80. The control circuit 80 is constituted by three OR circuits 81, 82, and 83, a divider circuit 85, and a time constant circuit 86. The input terminal e of the control circuit 80 is connected to one input terminal of the OR circuit 81. The other input terminal thereof receives a start pulse which is generated in association with a power-on operation or a switching operation. An output terminal of the OR circuit 81 is connected to one input terminal of the OR circuit 82 and a clock terminal C of the divider circuit 85.

The divider circuit 85 is constituted by, for example, shift resistors of three stages. An output terminal $Q_0$ of the first stage is connected to one input terminal of the OR circuit 82, an output terminal $Q_1$ of the second stage is connected to a control terminal of the switch $S_1$, and an output terminal $Q_2$ of the third stage is connected to a control terminal of the switch $S_2$ and the other input terminal of the OR circuit 82. An output terminal of the OR circuit 82 is connected to a reset terminal R of the counter circuit 45 of the signal processing circuit 47.

The time constant circuit 86 detects that power is turned on, and its output terminal is connected to one input terminal of the OR circuit 83. The output terminal of the OR circuit 83 is connected to a reset terminal R of the divider circuit 85.

A second charge-completion detecting circuit 95 comprises a timer circuit 97. A reset terminal R thereof is connected to the output terminal $Q_2$ of the third stage of the divider circuit 85. An output terminal of the timer circuit 97 is connected to the other input terminal of the OR circuit 83. The timer 97 starts a count operation in response to a high level signal input to the reset terminal R, and when a predetermined limit time elapses, the output terminal thereof becomes high in level.

Figure 15A:
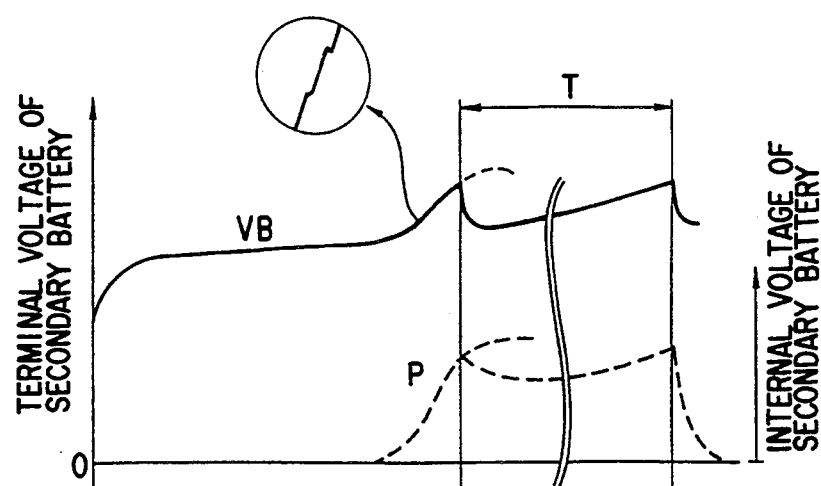
FIGS. 15A to 15D are voltage waveform diagrams for explaining an operation of the fourth embodiment.
Figure 15B:
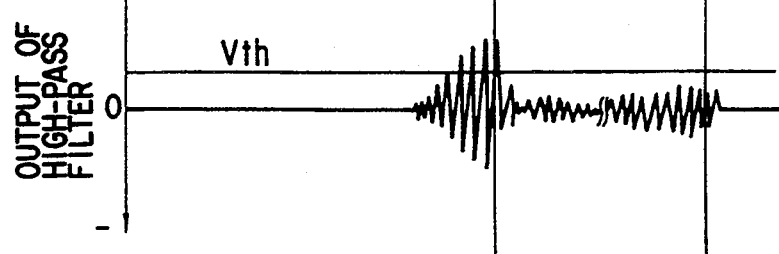
Figure 15C:
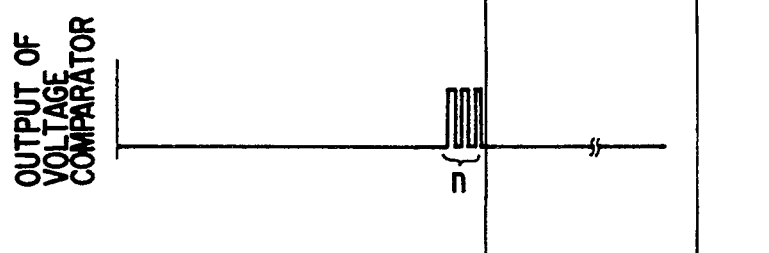
Figure 15D:
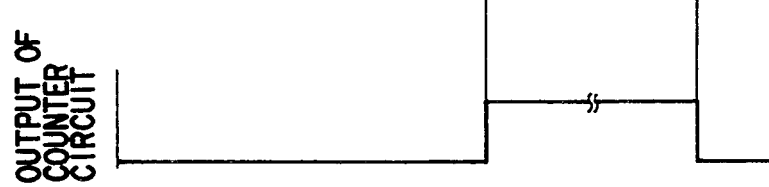

An operation of the charging circuit shown in FIG. 14 will be described below, with reference to voltage waveforms shown in FIGS. 15A to 15D. FIG. 15A shows the waveform of the terminal voltage $V_B$ of the secondary battery 10, FIG. 15B shows the waveform of the output of the high-pass filter, i.e., the minute voltage change extracting circuit 30, FIG. 15C shows the waveform of the output of the voltage comparator 41, and FIG. 15D shows the waveform of the output of the counter circuit 45.

When the power source of the charging circuit is turned on, the time constant circuit 86 outputs a pulse having a width determined by the time constant. The pulse is supplied through the OR circuit 83 to the reset terminal R of the divider circuit 85, with the result that the output terminal $Q_0$ of the first stage of the divider circuit 85 becomes high in level. In this state, since the output terminals $Q_1$ and $Q_2$ of the second and third stages of the divider circuit 85 are low in level, the switches $S_1$ and $S_2$ in the switching circuit 18 are turned off. Therefore, no current is supplied from the first and second charging power sources 21 and 22 to the secondary battery 10. When the output terminal $Q_0$ of the first stage of the divider circuit 85 is high in level, the output terminal of the OR circuit 82 is high in level. Accordingly, the reset terminal R of the counter circuit 45 is also high in level. Therefore, the counter circuit 45 is in the reset state.

Then, when a start pulse, which is generated in association with a power-on operation or a switching operation, is applied to one input terminal of the OR circuit 81, a pulse is input to the clock terminal C of the divider circuit 85 through the OR circuit 81. As a result, the output terminal $Q_1$ of the second stage of the divider circuit 85 becomes high in level. Accordingly, the switch $S_1$ is turned on, thereby initiating a first charging. During the first charging, the secondary battery 10 is fast charged by a current $I_1$ supplied from the first charging power source 21. In this state, since output terminals $Q_0$ and $Q_2$ of the divider circuit 85 are low in level, the output terminal of OR circuit 82 is low in level, i.e., the reset terminal R of the counter circuit 45 is also low in level. Therefore, the counter circuit 45 is in the counting state.

When the process of charging the secondary battery 10 progresses into the last stage, oxygen gas is generated from the positive electrode of the secondary battery 10. If the secondary battery 10 is of sealed type, an internal pressure P is increased, as indicated by a broken line in FIG. 15A. While oxygen gas is being generated in the last stage of charging, the terminal voltage $V_B$ has a waveform as shown in an enlarged view in a circle of FIG. 15A, i.e., a minute voltage changes appear intermittently. The frequency components of the minute voltage changes are much greater than the frequency component of the macroscopic change of the terminal voltage $V_B$ corresponding to the change in the amount of charge of the secondary battery 10. The level of the minute voltage change is low when the change appears first, and becomes higher as the charge progresses and the amount of oxygen gas is increased.

Therefore, as shown in FIG. 15B, the minute voltage change extracting circuit 30, i.e., the high pass-filter generates an output corresponding to the minute change of the terminal voltage $V_B$ of the secondary battery 10. The output of the minute voltage change extracting circuit 30 is input to the signal processing circuit 47 and compared with the reference voltage $V_{th}$ by the voltage comparator 41. The voltage comparator 41 outputs a pulse signal in accordance with to the minute change of the terminal voltage $V_B$ of the secondary battery 10, as shown in FIG. 15C. The pulse signal is input to the count input terminal of the counter circuit 45.

The counter circuit 45 counts input pulse signals, and when the count becomes a predetermined value n, an output terminal d becomes high in level. A high level output from the output terminal d of the counter circuit 45 is supplied to the clock terminal C of the divider circuit 85 through the OR circuit 81. Accordingly, the output terminal $Q_2$ of the second stage of the divider circuit 85 becomes high in level. A high level output from the divider circuit 85 is supplied to the reset terminal R of the counter circuit 45 through the OR circuit 82. As a result, the counter circuit 45 is reset, and generates a low level output from the terminal d. The low level output is supplied to the clock terminal C of the divider circuit 85 through the OR circuit 81. In other words, when the first charging period terminates, a pulse signal is input to the clock terminal C of the divider circuit 85, and a second charging period starts.

In the second charging period, since the output terminal $Q_2$ of the divider circuit 85 is of high level, the switch $S_2$ of the switching circuit 18 is turned on and the secondary battery 10 is complementarily charged by the second charging power source 22. During the second charging period, since the secondary battery 20 is charged more slowly with a smaller amount of current $I_2$ than in the first charging period ($I_2<I_1$), the terminal voltage $V_B$ changes more moderately than in the first charging period. When the second charging period is initiated, the reset terminal R of the timer circuit 97 becomes high in level, with the result that the timer circuit 97 is reset and a counting operation starts. When the charging progresses and the count time of the timer circuit 97 becomes a preset limit time T, the timer circuit 97 generates a high level output. The high level output is input to the reset terminal R of the divider circuit 85 through the OR circuit 83. Hence, the divider circuit 85 is reset and only the output terminal $Q_0$ becomes high in level. Therefore, the switches $S_1$ and $S_2$ in the switching circuit 18 are turned off, with the result that no charging current is supplied to the secondary battery 10 from the first charging power source 21 or the second charging power source 22. Thus, the charging is stopped.

As has been described above, according to this embodiment, the secondary battery 10 is charged rapidly with a large amount of current $I_1$ in the first charging period. The first charge-completion detecting circuit 90 extract as a pulse signal a minute voltage change appearing in the waveform of the terminal voltage of the secondary battery 10. When the number of pulse signals becomes a preset value (n), the second charging period starts. In the second charging period, the secondary battery is complementarily charged with a smaller amount of current $I_2$ than in the first charging period. When the count time in the timer circuit 97 becomes a preset limit time, the charging is stopped.

Owing to the above operation, the secondary battery 10 can be charged substantially 100% of its electric capacitance in a short period of time without using a temperature sensor, unlike in the conventional apparatus. For example, assuming that $I_1=5$ CmA, and $I_2=1$ CmA, the secondary battery is charged substantially 80% of the electric capacitance within 10 minutes in the first charging period, and substantially 20% thereof within 12 minutes (the limit time of the timer circuit 97) in the second charging period. Thus, the secondary battery can be charged 100% within about 22 minutes in total.

The present invention is not limited to the above embodiments but can be variously modified as will be described below.

For example, the charge control of the present invention can be performed by various combining the first to fourth embodiments, or by combining the embodiments with the conventional charging control methods such as timer control, voltage control, and a temperature control.

In the first to fourth embodiments, the voltage comparator 41 used in the shaping circuit 40 is of normal type. However, if a voltage comparator having a hysteresis characteristic is used, a malfunction can be prevented even if a noise having a minute amplitude is superposed on the output from the minute voltage change extracting circuit.

Although in the first to third embodiments the minute voltage change detecting circuit 30 is directly connected to the shaping circuit 40, an amplifier may be interposed therebetween to raise the level of an input to the shaping circuit 40, so that a shaping operation can be performed easily. Further, a low-pass filter may be interposed between the minute voltage change extracting circuit 30 and the shaping circuit 40 to eliminate influence of a noise.

In the first to third embodiment, pulse signals output from the shaping circuit 40 are counted by the counter circuit 45 and when the count which has been accumulated since the start of a fast charging becomes a preset number n, the charge operation is controlled. However, instead, a reset pulse may be applied every predetermined time to the reset terminal d of the counter circuit 45, to control the charging when the number of pulses generated within the predetermined time becomes n.

In addition, a gate circuit may be interposed between the output terminal d of the shaping circuit 40 and the input terminal e of the counter circuit 45, to limit the number of pulse signals input to the counter circuit 45.

In FIGS. 6 and 8, a resistor may be connected in series with the switching elements 65, 66, and 67, to limit the current which flows from the capacitors $C_1$ and $C_2$ into the switching elements when the switching elements are in the ON state.

According to the third embodiment shown in FIG. 9, the differential amplifier 70 detects the difference between the terminal voltage of the secondary battery 10 and the voltage obtained by dividing the voltage output from the rectifier circuit 27. However, the voltage output from the rectifier circuit 27 can be input to the differential amplifier 70 without dividing. Further, the terminal voltage of the secondary battery 10 may be divided or amplified, and then input to the differential amplifier 70. In summary, it is only necessary to detect the difference between the voltage output from the rectifier circuit 27 or a voltage proportional thereto and the terminal voltage of the secondary battery 10 or a voltage proportional thereto.

Also, in the embodiment shown in FIG. 13, it is unnecessary to detect the difference between the terminal voltage of the secondary battery 10 and the voltage obtained by dividing the voltage output from the first rectifier circuit 27A, i.e., the voltage output from the first rectifier circuit 27A can be input to the differential amplifier 70 without dividing. Further, the terminal voltage of the secondary battery 10 may be divided or amplified, and then input to the differential amplifier 70. In summary, it is only necessary to detect the difference between the voltage output from the first rectifier circuit 27A or a voltage proportional thereto and the terminal voltage of the secondary battery 10 or a voltage proportional thereto.

In the third embodiment, it is assumed that the gain of the differential amplifier 70 is 1. However, the gain may be change by selecting the values of the resistors $R_{13}$ to $R_{19}$ suitably. For example, in a case where the secondary battery 10 is of the type in which the terminal voltage changes relatively greatly in the last stage of charging, if the gain of the differential amplifier 70 is set smaller than 1, influence of a noise can be reduced.

Also, in the third embodiment, the switching circuit 16 may be provided at any other position, so long as a current for charging the secondary battery 10 flows therethrough. If necessary, it may be provided on the primary side of the transformer 26.

In the fourth embodiment, the timer circuit 97 starts counting at the same time as the start of the second charging period. However, it may start counting at the same time as the start of the first charging period, and the limit time of the timer circuit 97 may be set to be the sum of the first and second charging periods. In this case, the constitution of the control circuit 80 can be simpler.

In the fourth embodiment, the first charging period is terminated upon detecting of the completion of charging by the first charge-completion detecting circuit 90. However, an additional timer circuit which starts counting at the same time as the start of the first charging period may be provided, and the first charging period can be terminated at an earlier timing, either when the limit time of the additional timer elapses or when the first charge-completion detecting circuit 90 detects completion of charging. With this operation, even if completion of the first charging is not detected for some reasons, for example, in a case where a minute voltage change does not clearly appear in the waveform of the terminal voltage in the last stage of charging, the first charging period can be terminated compulsorily in a predetermined period of time. Thus, the reliability of the operation is increased.

Further, in the fourth embodiment, charging currents are allowed to flow only in the first and second charging periods. However, a trickle charge may be performed in a period other than the first and second charging period, by using a current $I_3$ which is smaller than the current $I_2$ output from the second charging power source. Otherwise, the current $I_3$ may be allowed to flow, independent of the currents $I_1$ and $I_2$, during the first and second charging periods.

Moreover, various modifications may be made within the spirit of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A charging circuit of a secondary battery which charges the secondary battery having first and second terminals, comprising:

reference voltage generating means for generating a reference voltage, which is a difference between a potential of said first terminal and a potential of said second terminal thereof;

minute voltage change extracting means for extracting minute changes having components of a frequency higher than a predetermined level of a voltage output from said secondary battery during a process of charging said secondary battery, and generating output signals;

shaping means for shaping the output signals from said minute voltage change extracting means into pulse signals;

counting means for counting the pulse signals output from said shaping means; and charge control means for controlling the process of charging said secondary battery when the count of the pulse signals obtained by said counting means reaches a predetermined value; wherein said minute voltage change extracting means has two input terminals, one receiving the reference voltage generated from said reference voltage generating means and the other receiving the potential of the second terminal of said secondary battery, said minute voltage change extracting means extracting minute voltage changes which appear in a last stage of the process of charging said secondary battery and have frequency components higher than a change in a terminal voltage corresponding to an amount of charge.

2. A charging circuit of a secondary battery according to claim 1, wherein said minute voltage change extracting means includes:
an operational amplifier having two input terminals and one output terminal, one of the input terminals receiving the reference voltage generated by said reference voltage generating means;
a capacitor connected between the other input terminal of said operational amplifier and the second terminal of said secondary battery; and
a resistor connected between the other input terminal and the output terminal of the operational amplifier.

3. A charging circuit of a secondary battery according to claim 2, further comprising a charging power source having ends for charging said secondary battery, wherein said operational amplifier has positive and negative power source terminals which are respectively connected to the ends of said charging power source.

4. A charging circuit of a secondary battery according to claim 1, wherein said minute voltage change extracting means is constituted by one of a high-pass filter and a band-pass filter.

5. A charging circuit of a secondary battery according to claim 1, wherein said minute voltage change extracting means is constituted by a differential circuit.

6. A charging circuit of a secondary battery according to claim 1, wherein said shaping means includes a comparator for comparing the output signals from said minute voltage change extracting means with a predetermined voltage, and outputting the pulse signals when the output signals have a voltage higher than the predetermined voltage.

7. A charging circuit of a secondary battery according to claim 6, wherein said shaping means further includes a rectifier circuit connected between said minute voltage change extracting means and said comparator.

8. A charging circuit of a secondary battery according to claim 7, wherein said shaping means further includes an integral circuit connected between said rectifier circuit and said comparator.

9. A charging circuit of a secondary battery according to claim 7, wherein said shaping means further includes a peak-to-peak detector connected between said minute voltage change detecting means and said comparator, said peak-to-peak detector detecting a difference between maximum and minimum values of a voltage change in said secondary battery.

10. A charging circuit of a secondary battery according to claim 9, wherein said shaping means further includes an integral circuit connected between said peak-to-peak detector and said comparator.

11. A charging circuit of a secondary battery according to claim 1, wherein said minute voltage change extracting means further comprises a time constant element and time constant control means for decreasing the time constant of said time constant element when the process of charging is started.

12. A charging circuit of a secondary battery according to claim 11, wherein
said minute voltage change extracting means comprises:
an operational amplifier having a non-inverting input terminal to which the reference voltage is applied and an inverting input terminal;
a capacitor and a first resistor connected in series between an input terminal of said minute voltage extracting means and said inverting input terminal; and
a second resistor connected between the inverting input terminal and an output terminal of said minute voltage change extracting means, and
wherein said time constant control means comprises first and second switching elements for short-circuiting said first and second resistors when charging is started.

13. A charging circuit of a secondary battery according to claim 11, wherein
said minute voltage change extracting means comprises:
an input terminal;
an operational amplifier having an inverting input terminal and a non-inverting input terminal; and
a capacitor and a resistor connected in series between one of the input terminals of said minute voltage extracting means and said inverting input terminal of said operational amplifier, and
said time constant control means comprises a switching element for short-circuiting said non-inverting input terminal of said operational amplifier and the connection of said capacitor and said resistor.

14. A charging circuit of a secondary battery having a terminal comprising:
an AC power source;
a rectifier circuit having an input terminal connected to said AC power source, and an output terminal;
a charging current limiting resistor connected between the output terminal of said rectifier circuit and said secondary battery;
differential voltage detecting means for detecting difference between one of a voltage output from said output terminal of said rectifier circuit and a voltage proportional thereto on one hand, and one of a voltage at the terminal of said secondary battery and a voltage proportional thereto on the other;
minute voltage change extracting means for extracting minute changes having components of a frequency higher than a predetermined level of a voltage output from said secondary battery during a process of charging said secondary battery, and generating output signals;
shaping means for shaping the output signals from said minute voltage change extracting means into pulse signals;
counting means for counting the pulse signals output from said shaping means; and
charge control means for controlling the process of charging said secondary battery when the count of the pulse signals obtained by said counting means reaches a predetermined value.

15. A charging circuit of a secondary battery having a terminal comprising:

a first rectifier circuit having an input terminal connected to an AC power source;

a second rectifier circuit having an input terminal connected to the AC power source and an output terminal connected to said secondary battery;

differential voltage detecting means for detecting the difference between one of a voltage output from said first rectifier circuit and a voltage proportional thereto on one hand, and one of a voltage at the terminal of said secondary battery and a voltage proportional thereto on the other;

minute voltage change extracting means for extracting, in accordance with a detection result of said differential voltage detecting means, minute changes having components of a frequency higher than a predetermined level of a voltage output from said secondary battery during a process of charging said secondary battery, and generating output signals;

shaping means for shaping the output signals from said minute voltage change extracting means into pulse signals;

counting means for counting said pulse signals output from said shaping means; and charge control means for controlling the process of charging said secondary battery when the count of said pulse signals obtained by said counting means reaches a predetermined value.

16. A charging circuit of a secondary battery comprising:

a first charging power source;

a second charging power source for outputting a current smaller than said first charging power source;

switching means for connecting said first charging power source to said secondary battery in a first charging period, and connecting said second charging power source to said secondary battery in a second charging period;

first charge-completion detecting means including minute voltage change extracting means for extracting minute changes having components of a frequency a predetermined level higher than a voltage output from said secondary battery during a process of charging said secondary battery, and detecting completion of charging on the basis of a state of the minute voltage changes;

second charge-completion detecting means for detecting completion of charging when said charging circuit is brought into a predetermined state after the start of the second charging period; and control means for terminating the first charging period and bringing said charging circuit into the second charging period when the first charge-completion detecting means detects completion of charging, and terminating the second charging period when the second charge-completion detecting means detects completion of charging during the second charging period.

17. A charging circuit of a secondary battery according to claim 16, wherein said first charge-completion detecting means comprises a voltage comparator for comparing output signals from said minute voltage change extracting means with a reference voltage and a counter circuit for counting pulse signals output from said voltage comparator, and detects completion of charging when a count of said counter circuit reaches a predetermined value.

18. A charging circuit for charging a battery having a first and a second terminal, comprising:

a power source having a first output terminal and a second output terminal;

a reference voltage generator, connected to the first and second output terminals of the power source, having an output terminal with a reference voltage which is a constant voltage amount different than a voltage of the first output terminal of the power source, an absolute value of the constant voltage amount being greater than zero;

a minute voltage change extracting means, connected to the output terminal of the reference voltage generator and to the second terminal of the battery, for extracting minute changes having components of a frequency higher than a predetermined level of a voltage output from the charging of the secondary battery, the minute voltage change extracting means including two power supply terminals which are respectively connected to the two output terminals of the power source, and an output terminal for outputting the extracted minute changes;

shaping means, connected to the output terminal of the minute voltage change extracting means, for shaping the extracted minute changes into output pulses, the output pulses being outputted by an output terminal of the shaping means;

control means, connected to the output terminal of the shaping means and to the power source, for selectively connecting the power source to the first and second terminals of the battery so that the power source charges the battery, depending on a signal of the output terminal of the shaping means.

19. A charging circuit according to claim 18, wherein the shaping means comprises:

a first amplifier which performs the shaping of the extracted minute changes into output pulses, the output pulses being outputted by an output terminal of the first amplifier, the first amplifier including two power supply terminals which are respectively connected to the two output terminals of the power source; and wherein the minute voltage change extracting means includes a second amplifier having two inputs, two power supply terminals, and an output, the two inputs of the second amplifier are respectively connected to the output terminal of the reference voltage generator and to the second terminal of the battery, the two power supply terminals of the second amplifier are respectively connected to the first and second output terminals of the power source, and the output of the second amplifier outputs the extracted minute changes.

20. A charging circuit according to claim 19, wherein the signal on the output terminal of the shaping means includes a plurality of pulses; and wherein the control means comprises:

a counter circuit, connected to the output terminal of the shaping means, for counting the plurality of pulses on the output terminal of the shaping means; and wherein the control means selectively connects the power source to the battery depending on a number of the plurality of pulses counted by the counter circuit.

21. A charging circuit according to claim 20, wherein the first and second output terminals of the power source are the only power source terminals connected to the minute voltage change extracting means, and the shaping means.

* * * * *